US010693686B2

(12) United States Patent
Shi et al.

(10) Patent No.: US 10,693,686 B2
(45) Date of Patent: Jun. 23, 2020

(54) DFE OPEN LOOP TRAINING FOR DDR DATA BUFFER AND REGISTERED CLOCK DRIVER

(71) Applicant: Integrated Device Technology, Inc., San Jose, CA (US)

(72) Inventors: Xudong Shi, San Jose, CA (US); Paul Scott, Santa Clara, CA (US)

(73) Assignee: Christopher P. Maiorana, San Jose, CA (US)

( * ) Notice: Subject to any disclaimer, the term of this patent is extended or adjusted under 35 U.S.C. 154(b) by 0 days.

(21) Appl. No.: 16/117,338

(22) Filed: Aug. 30, 2018

(65) Prior Publication Data

US 2020/0076652 A1 Mar. 5, 2020

(51) Int. Cl.
*H04L 25/03* (2006.01)
*G06F 11/22* (2006.01)
*G06F 13/16* (2006.01)

(52) U.S. Cl.
CPC .... *H04L 25/03057* (2013.01); *G06F 11/2284* (2013.01); *G06F 13/1673* (2013.01)

(58) Field of Classification Search
CPC ........... H04L 25/03057; G06F 11/2284; G06F 13/1673
See application file for complete search history.

(56) References Cited

U.S. PATENT DOCUMENTS

| | | | |
|---|---|---|---|
| 9,860,088 B1* | 1/2018 | Desimone | H04L 25/03057 |
| 10,469,292 B1* | 11/2019 | Wankmueller | H04L 25/03057 |
| 2006/0188043 A1* | 8/2006 | Zerbe | H04L 1/0026 375/346 |
| 2010/0219996 A1* | 9/2010 | Abel | H04L 25/061 341/120 |
| 2018/0276165 A1* | 9/2018 | Matsumoto | H04L 25/03 |
| 2018/0294999 A1* | 10/2018 | Giovannini | G06F 3/0604 |
| 2019/0095308 A1* | 3/2019 | Morris | G01R 31/317 |

* cited by examiner

*Primary Examiner* — David B Lugo
(74) *Attorney, Agent, or Firm* — Christopher P. Maiorana, PC

(57) ABSTRACT

An apparatus includes an interface and a training circuit. The interface may be configured to transmit signals to/from a plurality of I/O channels. The training circuit may be configured to generate a training voltage on a current one of the I/O channels, read an output of an eye monitor slicer to determine voltage transition values corresponding to the training voltage at a plurality of sampling times, map the voltage transition values to coefficients for the current I/O channel and determine the coefficients for each of the I/O channels. The training circuit may comprise the eye monitor slicer. The voltage transition values may correspond to an interference response for one of the I/O channels. The coefficients may be applied as feedback to cancel the interference.

16 Claims, 8 Drawing Sheets

DFE OPEN LOOP TRAINING FOR DDR DATA BUFFER AND REGISTERED CLOCK DRIVER

FIELD OF THE INVENTION

The invention relates to computer memory generally and, more particularly, to a method and/or apparatus for implementing a DFE open loop training for DDR data buffer and registered clock driver.

BACKGROUND

In computer memory, such as dynamic random-access memory (DRAM), incoming data (i.e., DQ) and command/address signals from a host suffer from intersymbol interference (ISI). Intersymbol interference can be caused by both channel bandwidth limitations and reflections. Intersymbol interference results in a closing of an eye response of a received signal.

To mitigate the effects of ISI, the Joint Electron Device Engineering Council (JEDEC) introduced decision feedback equalization (DFE) in the data buffer in DDR4 memory and in the data buffer and registered clock driver in DDR5. The actual implementation of DFE is undefined. A simple and robust method for implementing DFE is needed.

It would be desirable to implement a DFE open loop training for DDR data buffer and registered clock driver.

SUMMARY

The invention concerns an apparatus comprising an interface and a training circuit. The interface may be configured to transmit signals to/from a plurality of I/O channels. The training circuit may be configured to generate a training voltage on a current one of the I/O channels, read an output of an eye monitor slicer to determine voltage transition values corresponding to the training voltage at a plurality of sampling times, map the voltage transition values to coefficients for the current I/O channel and determine the coefficients for each of the I/O channels. The training circuit may comprise the eye monitor slicer. The voltage transition values may correspond to an interference response for one of the I/O channels. The coefficients may be applied as feedback to cancel the interference.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a DFE open loop training for DDR data buffer and registered clock driver that may (i) provide a simple and robust training method, (ii) obtain DFE tap coefficients, (iii) reduce the effects of intersymbol interference, (iv) prevent a reduction of the received signal eye, (v) determining a channel single bit response, (vi) apply DFE coefficients during operation, (vii) be applied to each of the DQ pins in a memory, (viii) be performed at a system boot time and/or (ix) be implemented as one or more integrated circuits.

Figure 1:
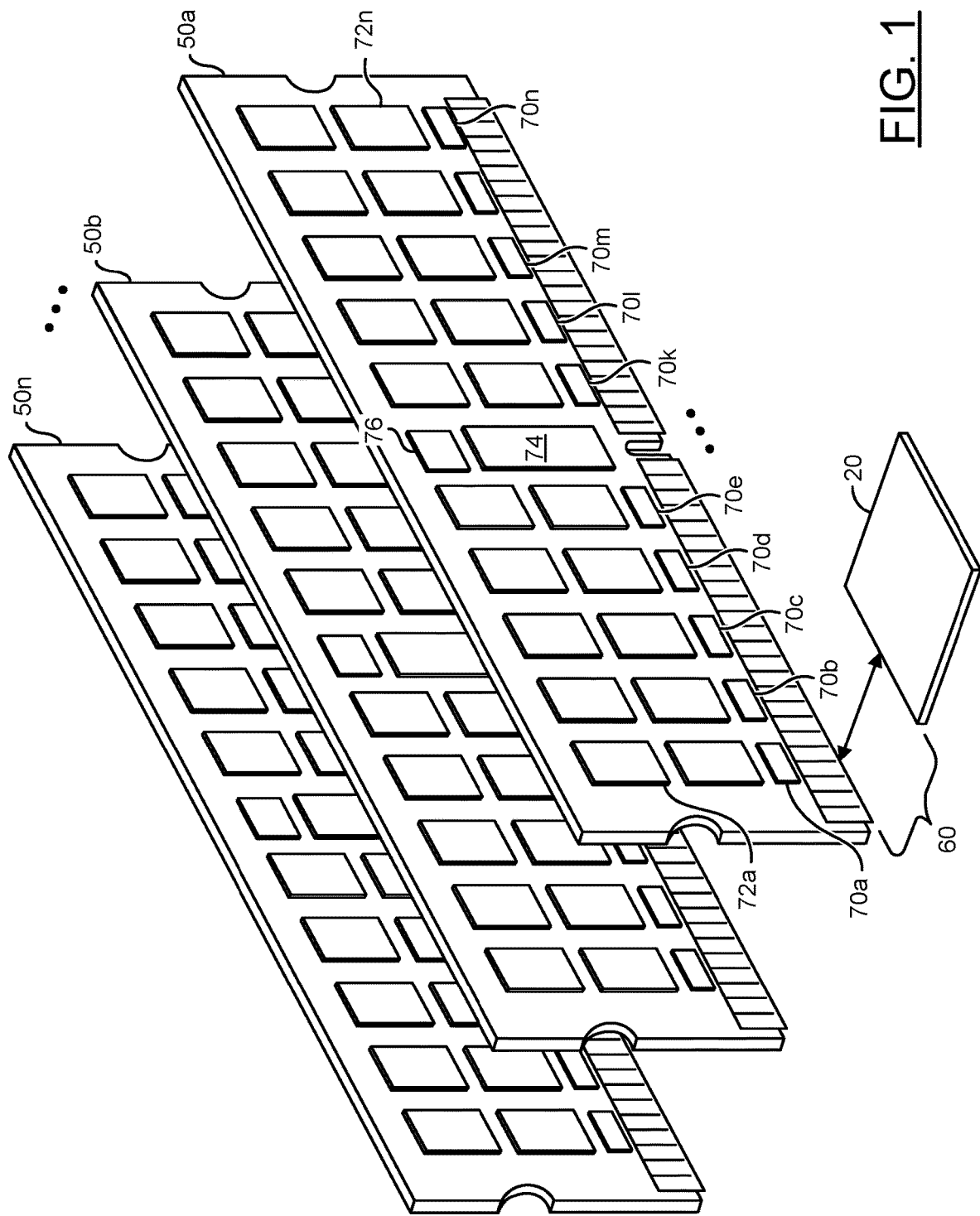
FIG. 1 is a diagram illustrating an example embodiment of a memory system.

Referring to FIG. 1, a diagram of a memory system is shown in accordance with an example embodiment of the invention. In various embodiments, the memory system includes a number of circuits 50a-50n. The circuits 50a-50n may be implemented as memory modules (or boards). In an example, the circuits 50a-50n may be implemented as dual in-line memory modules (DIMMs). In some embodiments, the circuits 50a-50n may be implemented as double data rate fourth generation (DDR4) synchronous dynamic random-access memory (SDRAM) modules. In some embodiments, the circuits 50a-50n may be implemented as double data rate fifth generation (DDR5) SDRAM modules.

In various embodiments, the circuits 50a-50n may comprise a number of blocks (or circuits) 70a-70n, a number of blocks (or circuits) 72a-72n, a block (or circuit) 74, a block (or circuit) 76 and/or various other blocks, circuits, pins, connectors and/or traces. The circuits 70a-70n may be configured as data buffers. The circuits 72a-72n may implement memory devices. In an example, the circuits 72a-72n may be implemented as synchronous dynamic random-access memory (SDRAM) devices (or chips, or modules). The circuit 74 may be implemented as a registered clock driver (RCD). In an example, the RCD circuit 74 may be implemented as a DDR4 RCD circuit. In another example, the RCD circuit 74 may be implemented as a RCD circuit compliant with the JEDEC specification (e.g., DDR5 standard). The circuit 76 may be implemented as a power management integrated circuit (PMIC). The type, arrangement and/or number of components of the memory modules 50a-50n may be varied to meet the design criteria of a particular implementation.

The memory modules 50a-50n are shown connected to a block (or circuit) 20. The circuit 20 may implement a memory controller and/or host controller. The circuit 20 may be located in another device, such as a computing engine. Various connectors/pins/traces 60 may be implemented to connect the memory modules 50a-50n to the memory controller 20. In some embodiments, the connectors/pins/traces 60 may be a 288-pin configuration. In an example, the memory controller 20 may be a component of a computer motherboard (or main board or host device). In another example, the memory controller 20 may be a component of a microprocessor. In yet another example, the memory controller 20 may be a component of a central processing unit (CPU).

In an example, some of the connectors/pins/traces 60 may be part of the memory modules 50a-50n and some of the connectors/pins/traces 60 may be part of the motherboard and/or memory controller 20. The memory modules 50a-50n may be connected to the computer motherboard (e.g., by pins, traces and/or connectors 60) to transfer data between components of a computing device and the memory modules 50a-50n. In some embodiments, the connectors/pins/traces 60 may implement an 80-bit bus. In an example, the memory controller 20 may be implemented on a northbridge of the motherboard and/or as a component of a microprocessor (e.g., an Intel CPU, an AMD CPU, an ARM CPU, etc.). The implementation of the memory controller 20 may be varied according to the design criteria of a particular implementation.

In various embodiments, the circuits 50a-50n may be implemented as DDR4 (or DDR5) SDRAM memory modules. In an example, the circuits 50a-50n may have a memory module density of 128 gigabyte (GB), one terabyte (TB), or higher per module (e.g., compared to 16GB per dual in-line memory module (DIMM) in DDR3). In embodiments implementing DDR4 compliant SDRAM memory modules, the circuits 50a-50n may operate at voltages of 1.2-1.4 volts (V) with a frequency between 800-4266 megahertz (MHZ) (e.g., compared to 1.5-1.65V at frequencies between 400-1067 MHZ in DDR3). In embodiments implementing DDR5 compliant SDRAM memory modules, the circuits 50a-50n may operate with a frequency of 1.2-3.2 giga-Hertz (GHz) and/or higher frequencies. In embodiments implementing DDR5 standard SDRAM memory modules, there may be 5 memory modules on each side of the RCD 74.

In some embodiments, the circuits 50a-50n may be implemented as low voltage DDR4 memory modules and operate at 1.05V. For example, in embodiments implementing low voltage DDR4 SDRAM memory modules, the circuits 50a-50n may implement 35% power savings compared to DDR3 memory. In embodiments implementing DDR4 SDRAM memory modules, the circuits 50a-50n may transfer data at speeds of about 1.6 to 3.6 giga-transfers per second (GT/s) and higher (e.g., compared to 0.8-2.13 GT/s in DDR3). In embodiments implementing DDR5 standard SDRAM memory modules, the circuits 50a-50n may have a data rate range from 3.2 GT/s to 4.6 GT/s. The operating parameters of the memory modules 50a-50n may be varied according to the design criteria of a particular implementation.

In an example, the memory modules 50a-50n may be compliant with the DDR4 specification entitled "DDR4 SDRAM", specification JESD79-4B, June 2017, published by the Joint Electron Device Engineering Council (JEDEC) Solid State Technology Association, Arlington, Va. Appropriate sections of the DDR4 specification (e.g., the DDR4 JEDEC specification) are hereby incorporated by reference in their entirety. In another example, the memory modules 50a-50n may be implemented according to a fifth generation (DDR5) standard (e.g., for which a standard is currently under development by JEDEC). References to the DDR5 standard may refer to a latest working and/or draft version of the DDR5 specification published and/or distributed to committee members by JEDEC as of May 2018. Appropriate sections of the DDR5 standard are hereby incorporated by reference in their entirety. The JEDEC specification may refer to the DDR4 SDRAM specification, a DDR5 SDRAM specification and/or specifications for future generations of DDR SDRAM.

In some embodiments, the memory modules 50a-50n may be implemented as DDR4 load reduced DIMM (LRDIMM). The data buffers 70a-70n may allow the memory modules 50a-50n to operate at higher bandwidth and/or at higher capacities compared to DDR4 RDIMM (e.g., 2400 or 2666 MT/s for DDR4 LRDIMM compared to 2133 or 2400 MT/s for DDR4 RDIMM at 384 GB capacity). For example, compared to DDR4 RDIMM configurations, the DDR4 LRDIMM configuration of the memory modules 50a-50n may allow improved signal integrity on data signals and/or better intelligence and/or post-buffer awareness by the memory controller 20.

Figure 2:
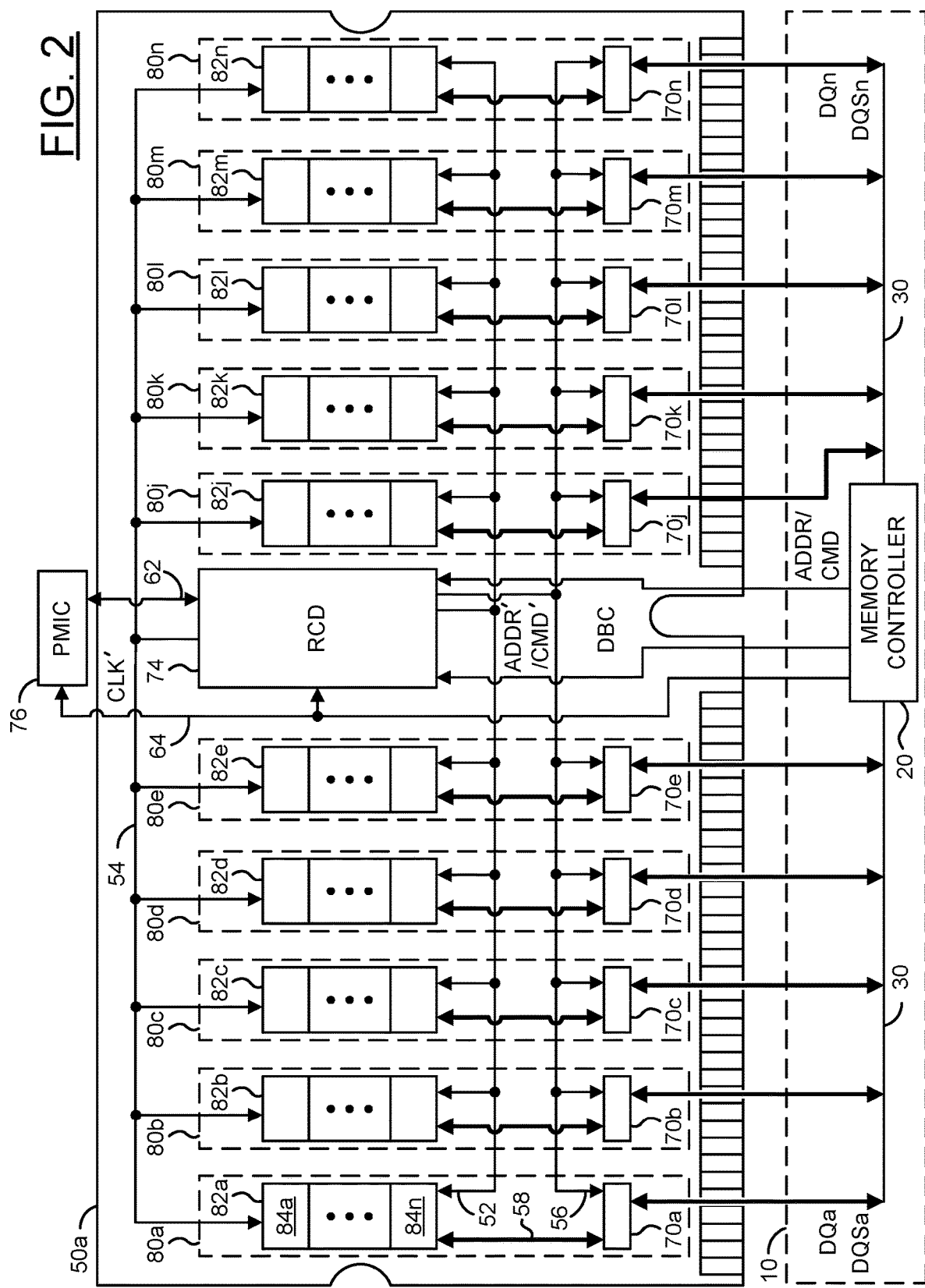
FIG. 2 is a block diagram illustrating a memory module of FIG. 1.

Referring to FIG. 2, a block diagram is shown illustrating a memory module 50a of FIG. 1. The memory module 50a may be representative of the memory modules 50b-50n. The memory module 50a is shown communicating with the memory controller 20. The memory controller 20 is shown as part of a block (or circuit) 10. The circuit 10 may be a motherboard (or main board), or other electronic component or computing engine or host device that communicates with the memory module 50a.

The memory module 50a may comprise one or more blocks (or circuits) 80a-80n, the RCD circuit 74 and/or the PMIC 76. The circuits 80a-80n may implement data paths of the memory module 50a. For example, the data path 80a may include a block 82a and/or the data buffer 70a. The data paths 80b-80n may have similar implementations. In the example shown, the memory module 50a may comprise five data paths (e.g., 80a-80e) on one side of the RCD 74 and five data paths (e.g., 80j-80n) on another side of the RCD 74. The circuits 82a-82n may each be implemented as a memory channel. Each of the memory channels 82a-82n may comprise a number of blocks (or circuits) 84a-84n. The circuits 84a-84n may be implemented as random access memory (RAM) chips. For example, the RAM chips 84a-84n may implement a volatile memory such as dynamic RAM (DRAM). The RAM chips 84a-84n may be the SDRAM devices 72a-72n (e.g., the chips 84a-84n may comprise one or more of the circuits 72a-72n located within one of the memory channels 82a-82n). In some embodiments, the RAM chips 84a-84n may be physically located on both sides (e.g., the front and back) of the circuit board of the memory modules 50a-50n. A capacity of memory on the memory module 50a may be varied according to the design criteria of a particular implementation.

The memory controller 20 may generate a clock signal (e.g., CLK), a number of control signals (e.g., ADDR/CMD) and/or a number of commands. The signal CLK and/or the signals ADDR/CMD may be presented to the RCD circuit 74. The commands may be presented to the PMIC 76 via a bus 64. A data bus 30 may be connected between the memory controller 20 and the data paths 80a-80n. The memory controller 20 may generate and/or receive data signals (e.g., DQa-DQn) and data strobe signals (e.g. DQSa-DQSn) that may be presented/received from the data bus 30. Portions of the signals DQa-DQn and DQSa-DQSn may be presented to respective data paths 80a-80n. For example, the signals DQa-DQn may be the DQ signals defined in the JEDEC specification and the signals DQSa-DQSn may be the DQS signals defined in the JEDEC specification. In the example shown, each of the signals DQa-DQn may have a corresponding signal DQSa-DQSn, however in some embodiments, one DQS signal may strobe multiple (e.g., four) DQ signals.

The RCD circuit 74 may be configured to communicate with the memory controller 20, the data buffers 70a-70n, the memory channels 82a-82n and/or the PMIC 76. The RCD circuit 74 may decode instructions (e.g., control words) received from the memory controller 20. For example, the RCD circuit 74 may receive register command words (RCWs). In another example, the RCD circuit 74 may receive buffer control words (BCWs). The RCD circuit 74 may be configured to train the DRAM chips 84a-84n, the data buffers 70a-70n and/or command and address lines between the RCD circuit 74 and the memory controller 20. For example, the RCWs may flow from the memory controller 20 to the RCD circuit 74. The RCWs may be used to configure the RCD circuit 74.

The RCD circuit 74 may be used in both LRDIMM and RDIMM configurations. The RCD circuit 74 may implement a 32-bit 1:2 command/address register. For example, the RCD circuit 74 may have two sets (e.g., A and B) of command/address outputs. The RCD circuit 74 may support an at-speed bus (e.g., a BCOM bus between the RCD circuit 74 and the data buffers 70a-70n). The RCD circuit 74 may implement automatic impedance calibration. The RCD circuit 74 may implement command/address parity checking. The RCD circuit 74 may control register RCW readback. In an example, the RCD circuit 74 may implement a serial communication bus (e.g., a 1 MHz inter-integrated circuit ($I^2C$) bus, etc.). However, other types of management bus protocols (e.g., sideband interface, etc.) may be implemented to meet design criteria of particular implementations. In some embodiments, the RCD circuit 74 may implement a 12.5 MHz inter-integrated circuit ($I^3C$) bus. Inputs to the RCD circuit 74 may be pseudo-differential using external and/or internal reference voltages. The clock outputs, command/address outputs, control outputs and/or data buffer control outputs of the RCD circuit 74 may be enabled in groups and independently driven with different strengths.

The RCD circuit 74 may receive the signal CLK and/or the signals ADDR/CMD from the memory controller 20. Various digital logic components of the RCD circuit 74 may be used to generate signals based on the signal CLK and/or the signals ADDR/CMD and/or other signals (e.g., RCWs). The RCD circuit 74 may also be configured to generate a signal (e.g., CLK') and signals (e.g., ADDR'/CMD'). For example, the signal CLK' may correspond with a signal Y_CLK in the DDR4 specification. The signal CLK' and/or the signals ADDR'/CMD' may be presented to each of the memory channels 82a-82n. In one example, the signals ADDR'/CMD' and CLK' may be transmitted on a common bus 52 and a common bus 54, respectively. In another example, the RCD circuit 74 may implement a single ADDR/CMD input and two ADDR'/CMD' outputs to support a 1:2 command/address architecture. The RCD circuit 74 may generate one or more signals (e.g., DBC). The signals DBC may be presented to the data buffers 70a-70n. The signals DBC may implement data buffer control signals. The signals DBC may be transmitted on a common bus 56 (e.g., a data buffer control bus).

The data buffers 70a-70n may be configured to receive commands and data from the bus 56. The data buffers 70a-70n may be configured to generate/receive data to/from the bus 30. The bus 30 may comprise traces, pins and/or connections between the memory controller 20 and the data buffers 70a-70n. A bus 58 may carry the data between each of the data buffers 70a-70n and respective memory channels 82a-82n. The data buffers 70a-70n may be configured to buffer data on the buses 30 and 58 for write operations (e.g., data transfers from the memory controller 20 to the corresponding memory channels 82a-82n). The data buffers 70a-70n may be configured to buffer data on the buses 30 and 58 for read operations (e.g., data transfers from the corresponding memory channels 82a-82n to the memory controller 20).

The data buffers 70a-70n may exchange data with the DRAM chips 84a-84n in small units (e.g., 4-bit nibbles for ×4 DRAMS or 8-bit bytes for ×8 DRAMs). In various embodiments, the DRAM chips 84a-84n may be arranged in multiple (e.g., two) sets. For two set/two DRAM chip (e.g., 84a-84b) implementations, each set may contain a single DRAM chip (e.g., 84a or 84b). Each DRAM chip 84a-84b may be connected to the respective data buffers 70a-70n through an upper nibble and a lower nibble, or a byte. For two set/four DRAM chip (e.g., 84a-84d) implementations, each set may contain two DRAM chips (e.g., 84a-84b or 84c-84d). A first set may be connected to the respective data buffers 70a-70n through the upper nibble. The other set may be connected to the respective data buffers 70a-70n through the lower nibble. For two set/eight DRAM chip (e.g., 84a-84h) implementations, each set may contain four of the DRAM chips 84a-84h. A set of four DRAM chips (e.g., 84a-84d) may connect to the respective data buffers 70a-70n through the upper nibble. The other set of four DRAM chips (e.g., 84e-84h) may connect to the respective data buffers 70a-70n through the lower nibble. Other numbers of sets, other numbers of DRAM chips, and other data unit sizes may be implemented to meet the design criteria of a particular implementation.

The DDR4 LRDIMM configuration may reduce a number of data loads to improve signal integrity on a data bus (e.g., the bus 30) of the memory module from a maximum of several (e.g., four) data loads down to a single data load. The distributed data buffers 70a-70n may allow DDR4 LRDIMM designs to implement shorter I/O trace lengths compared to DDR3 LRDIMM designs, which use a centralized memory buffer. For example, shorter stubs connected to the memory channels 82a-82n may result in less pronounced signal reflections (e.g., improved signal integrity). In another example, the shorter traces may result in a reduction in latency (e.g., approximately 1.2 nanoseconds (ns), which is 50% less latency than DDR3 buffer memory). In yet another example, the shorter traces may reduce I/O bus turnaround time. For example, without the distributed data buffers 70a-70n (e.g., in DDR3 memory applications) traces would be routed to a centrally located memory buffer, increasing trace lengths up to six inches compared to the DDR4 LRDIMM implementation shown in FIG. 2.

In some embodiments, the DDR4 LRDIMM configuration may implement nine of the data buffers 70a-70n. The memory modules 50a-50n may implement 2 millimeter (mm) frontside bus traces and backside traces (e.g., the connectors/pins/traces 60). A propagation delay through the data buffers 70a-70n may be 33% faster than through a DDR3 memory buffer (e.g., resulting in reduced latency). In some embodiments, the data buffers 70a-70n may be smaller (e.g., a reduced area parameter) than a data buffer used for DDR3 applications.

An interface 62 is shown. The interface 62 may be configured to enable communication between the RCD circuit 74 and the PMIC 76. For example, the interface 62 may implement a register clock driver/power management integrated circuit interface (e.g., a RCD-PMIC interface). The interface 62 may comprise one or more signals and/or connections. Some of the signals and/or connections implemented by the interface 62 may be unidirectional. Some of the signals and/or connections implemented by the interface 62 may be bidirectional. The interface 62 may be enabled by the host memory controller 20. In one example, the memory controller may enable the interface 62 for the RCD using the signal ADDR/CMD. In another example, the memory controller 20 may enable the interface 62 for the PMIC 76 by presenting an enable command.

The bus 64 may be implemented as a host interface bus. The host interface bus 64 may be bi-directional. The host interface bus 64 may be configured to communicate commands and/or other data to the PMIC 76 and/or other components of the memory module 50a. In some embodiments, the bus 64 may communicate with the RCD 74. In some embodiments, the host interface bus 64 may implement an I²C protocol. In some embodiments, the host interface bus 64 may implement an I³C protocol. The protocol implemented by the host interface 64 may be varied according to the design criteria of a particular implementation.

Figure 3:
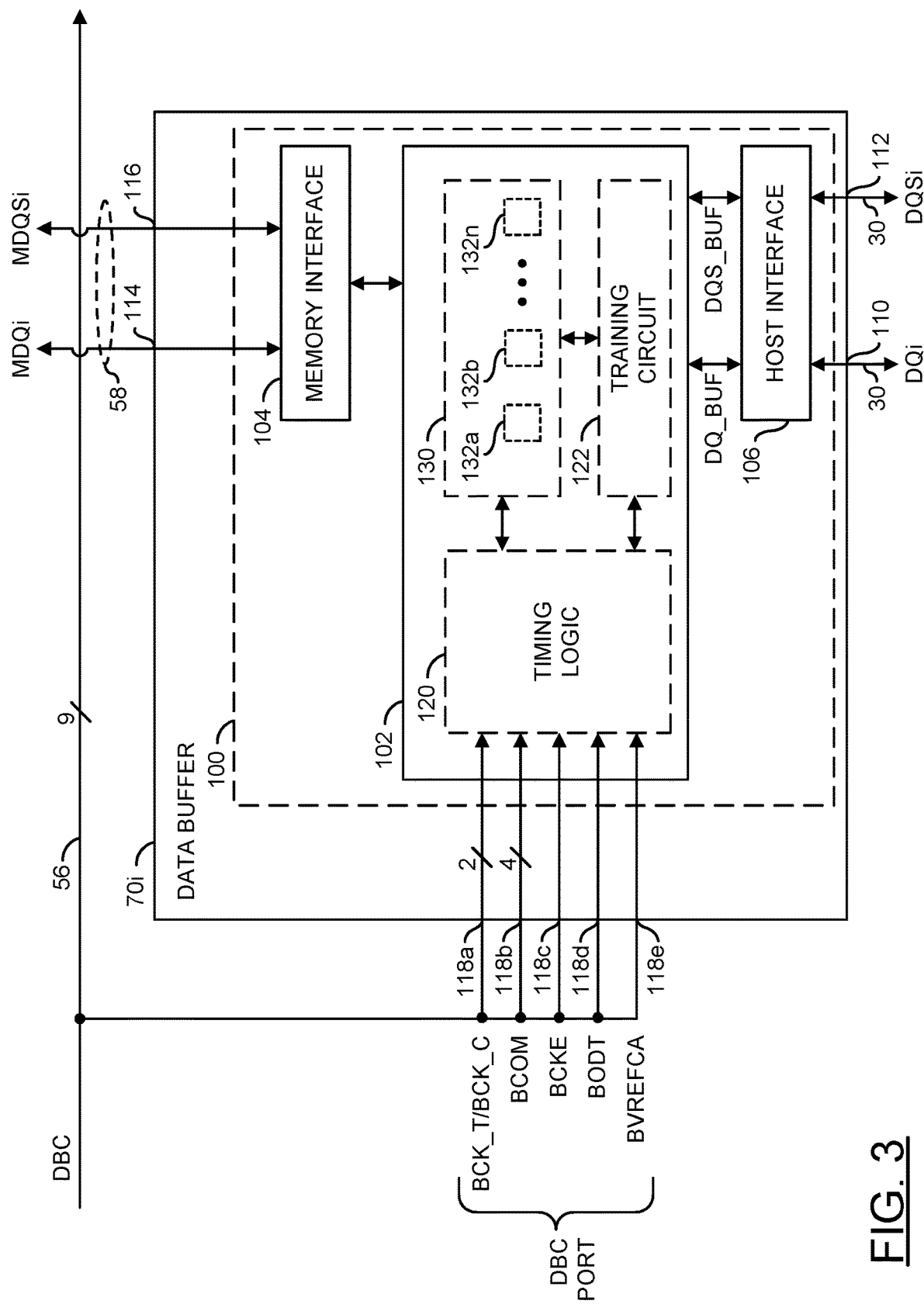
FIG. 3 is a block diagram illustrating an example data buffer of FIG. 1.

Referring to FIG. 3, a diagram is shown illustrating a data buffer 70i in accordance with an example embodiment of the invention. The data buffer 70i may be representative of an example embodiment of the data buffers 70a-70n. The data buffer 70i is shown having a first input/output 110, a second input/output 112, a third input/output 114 and a fourth input/output 116.

The first input/output 110 is configured for presenting/receiving the signals DQi (e.g., the data signals DQ corresponding to a memory channel) between the data buffer 70i and the controller 20. The second input/output 112 is configured for presenting/receiving the signals DQSi (e.g., the data strobe signals DQS corresponding to the memory channel) between the data buffer 70i and the controller 20. The third input/output 114 is configured for presenting/receiving the signals DQi as memory input/output signals (e.g., MDQi) corresponding to a memory channel between the data buffer 70i and the respective memory devices (e.g., DRAM chips) 72a-72n. The fourth input/output 116 is configured for presenting/receiving the signals DQSi as memory input/output signals (e.g., MDQSi) corresponding to a memory channel between the data buffer 70i and the respective memory devices (e.g., DRAM chips) 72a-72n.

The signals MDQi and/or MDQSi are generally transmitted between the memory modules 72a-72n and the respective data buffer 70a-70n. In an example, data (e.g., the signals DQi) and/or a data strobe (e.g., the signal DQSi) from the memory controller 20 may be presented to the data buffer 70i, buffered in the data buffer 70i, then transmitted to the respective memory device(s) 72a-72n. In another example, data from the respective memory device(s) 72a-72n (e.g., MDQi) and/or a data strobe (e.g., the signal MDQSi) may be presented to the data buffer 70i, buffered in the data buffer 70i, and then transmitted on an appropriate memory channel to the memory controller 20.

The data buffer 70i is shown also receiving signals (e.g., DBC) from the bus 56 at a control port (e.g., DBC PORT). The signals DBC may be presented to the data buffers 70a-70n (e.g., using the data buffer control bus 56). In an example, the signals DBC are illustrated comprising five signals transmitted over 9 pins/bits (e.g., a pair of signals BCK_T/BCK_C, a signal BCOM, a signal BCKE, a signal BODT and/or a signal BVREFCA). However, other numbers of pins/bits may be implemented accordingly to meet the design criteria of a particular application. The control port of the data buffer 70i is shown having an input 118a receiving the signals BCK_T/BCK_C, an input 118b receiving the signal BCOM, an input 118c receiving the signal BCKE, an input 118d receiving the signal BODT, and an input 118e receiving the signal BVREFCA.

In various embodiments, the signals BCK_T/BCK_C may be implemented as a 2-bit signal representing a differential (e.g., true (T) and complementary (C) versions) clock signal for the duplex data buffers 70a-70n. In an example, the signals BCK_T/BCK_C may represent a system clock. In various embodiments, the signal BCOM may be implemented as a 4-bit signal representing data buffer commands. However, other numbers of bits may be implemented accordingly to meet the design criteria of a particular application. The signal BCOM may be implemented as a unidirectional signal from the RCD circuit 74 to the duplex data buffers 70a-70n. In an example, the signal BCOM may be implemented at a single data rate (e.g., 1 bit per signal per clock cycle). However, a particular command may take a different number of clock cycles to transfer information. The signal BCKE may implement a buffered clock enable signal. In an example, the signal BCKE may be a function registered dedicated non-encoded signal (e.g., DCKE). The signal BODT may implement a buffered on-die termination signal. In an example, the signal BODT may be a function registered dedicated non-encoded signal (e.g., DODT). The signal BVREFCA may be a reference voltage for use with pseudo-differential command and control signals.

The data buffers 70a-70n may receive a set of data buffer commands (e.g., for writing buffer control words (BCWs)) from the signals DBC. The buffer control words may be used to customize operation of the respective channel of the data buffers 70a-70n. The buffer control words may flow from the memory controller 20, through the RCD circuit 74, to the data buffers 70a-70n. The buffer control words may be similar to register control words (RCWS) used for configuring the RCD circuit 74. Similar to commands for writing the register control words, the commands for writing the buffer control words may look like an MRS7 command, where the address lines are really the payload.

In embodiments where the bus 56 comprises nine pins, the RCD circuit 74 may do more than pass a buffer control word directly through to the data buffers 70a-70n. In one example, the RCD circuit 74 may convert (e.g., multiplex) an MRS7 command format into a buffer control word in a BCOM format. The RCD circuit 74 may map the 12 address bits of the MRS7 command into five separate data transfers, each 4 bits wide. The five data transfers may be set up back to back over the bus 56. For example, 5 clock cycles plus a parity cycle may be used to complete the buffer command in the buffer control word. Once the buffer control word reaches the data buffers 70a-70n, the data buffers 70a-70n may decode the buffer control word, write the buffer control word to a function space of the duplex data buffer, and complete the buffer command in the buffer control word.

A function of the signal BCOM may be to transmit the buffer control words. However, compliant with the JEDEC specification for DDR4 SDRAM, the duplex RCD circuit 74 may send all read/write commands and some MRS information over the bus 56 (e.g., to allow the data buffers 70a-70n to keep track of what the memory devices 72 are doing). In some embodiments, different buffer commands may take a different number of cycles to transfer the information.

In embodiments, implementing DDR4 SDRAM, the RCD circuit 74 may receive an MRS7 command from the memory controller 20 (e.g., from a host). For example, a host may want to change a parameter (e.g., typically on initialization or boot up of a computing device). The RCD circuit 74 may check the MRS7 command to determine whether the address bit 12 is set to 1 (e.g., a logical one). In an example, when an address bit 12 of the MRS7 command is set to 1, the RCD circuit 74 may recognize the command as a buffer command (e.g., a command that is not meant for the RCD circuit 74). The RCD circuit 74 may convert the command from the memory controller 20 to a buffer control word and send the buffer control word to the data buffers 70a-70n via the bus 56. The data buffers 70a-70n may write the buffer control word to a function space to complete the command.

In implementations compliant with DDR5, the RCD circuit 74 may receive a mode register write (MRW) command from the memory controller 20. The RCD circuit 74 forwards MRW commands to the memory devices 72a-72n and to the data buffers 70a-70n as long as the respective output interfaces are enabled to forward commands. The MRW commands generally contain a control word (CW) bit. The CW bit generally indicates if the command is intended for the memory devices 72a-72n or for the logic devices (e.g., the RCD circuit 74 or the data buffers 70a-70n). In MRW commands targeting the logic devices, the most significant bit of an 8-bit control word address may be used, for example, to identify if the target device is the RCD circuit 74 or the data buffers 70a-70n. In general, all devices in the memory modules 50a-50n have an opportunity to snoop configuration information intended for the other devices in the same module.

The data buffers 70a-70n may be configurable. The buffer commands may allow the memory controller 20 to customize aspects of termination (e.g., ODT) and, signal strength (e.g., DRV) on the DQ and DQS lines, and/or events (e.g., receiver timing, driver timing, etc.) in both directions (e.g., for both read and write operations). In some embodiments, some of the configurations of the data buffers 70a-70n may be decided based on system level configurations. Generally, most of the configuration of the data buffers 70a-70n may be decided during training steps. During training steps, host controllers (e.g., the memory controller 20) may test and compare results of various training steps to determine an optimal configuration.

In various embodiments, the bus 56 may be used to send commands/data to program configuration registers of the data buffers 70a-70n. The bus 56 may also be utilized to send commands (e.g., data reads and/or data writes) that control data traffic through the data buffers 70a-70n. For example, some commands may optimize power consumption and noise filtering (e.g. equalization) of the data buffers 70a-70n. In another example, read/write delays may be added per data line.

The data buffers 70a-70n may implement dual multi-bit (e.g., 4-bit) bi-directional data registers with differential data strobes (e.g., DQS_T/DQS_C). The data buffers 70a-70n may implement automatic impedance calibration. The data buffers 70a-70n may implement BCOM parity checking. The data buffers 70a-70n may implement control register (e.g., buffer control word) readback.

In some embodiments, the data buffers 70a-70n may comprise a block (or circuit or module or apparatus) 100. The circuit 100, implemented in one or more of the data buffers 70a-70n, may be configured to enable a decision feedback equalizer (DFE) open loop training architecture for a data buffer in a double data rate (DDR) memory system. The circuit 100 may be configured to obtain DFE coefficients by training each specific channel and system setting. For example, the circuit 100 may implement an open loop training approach. In some embodiments, the circuit 100 may be configured to mitigate intersymbol interference. For example, the intersymbol interference may be caused by bandwidth limitations and/or reflections. The circuit 100 may be configured to implement a training method to obtain DFE tap coefficients.

The circuit 100 may comprise a receiver data path for the data buffers 70a-70n. In the example shown, the circuit 100 may comprise a block (or circuit) 102, a block (or circuit) 104 and/or a block (or circuit) 106. The circuit 102 may implement one or more circuits and/or modules. In some embodiments, the circuit 102 may implement variable delay circuits, phase blender circuits and/or phase interpolator circuits. The circuit 104 may implement a memory interface. The circuit 106 may implement a host interface. The circuit 102 may generate/receive a signal (e.g., DQ_BUF) and/or a signal (e.g., DQS_BUF). In the example shown, the signal DQ_BUF may be a buffered version of the data signal DQi and the signal DQS_BUF may be a buffered version of the data strobe signal DQSi.

The circuit 102 may comprise a block (or circuit) 120, a block (or circuit) 122 and/or a block (or circuit) 130. The circuit 130 may comprise blocks (or circuits) 132a-132n. Details of the circuits 100-104, 120, 122, 130 and/or 132a-132n may be described in association with FIGS. 5-8. The circuit 100 may comprise other components and/or circuits (not shown). The number and/or type of components and/or the signals transmitted between the circuits of the apparatus 100 may be varied according to the design criteria of a particular implementation.

The circuit 120 may implement a timing logic circuit. In one example, the circuit 120 may be configured to solve complications and/or bandwidth limits caused by using a DLL and/or PLL in DDR5 when fixing a constant tPDM. In another example, the circuit 120 may be implemented as a fast loop compared to a DLL and/or PLL solution. In yet another example, the open loop architecture of the circuit 120 may reduce an accumulation of jitter in the source synchronization system enabling the data signals (e.g., DQi and/or MDQi) and the clock signals (e.g., DQSi and/or MDQSi) to track each other. The circuit 120 may be configured to align a strobe (e.g., clock) signal with a data signal to be parallel through a memory data path using a constant delay.

The circuit 122 may implement a training circuit. The circuit 130 may implement a register block. The circuits 132a-132n of the register block 130 may each implement a register circuit. For example, the registers 132a-132n may be implemented according to the JEDEC specification. The number and/or type of the registers 132a-132n may be varied according to the design criteria of a particular implementation.

Figure 4:
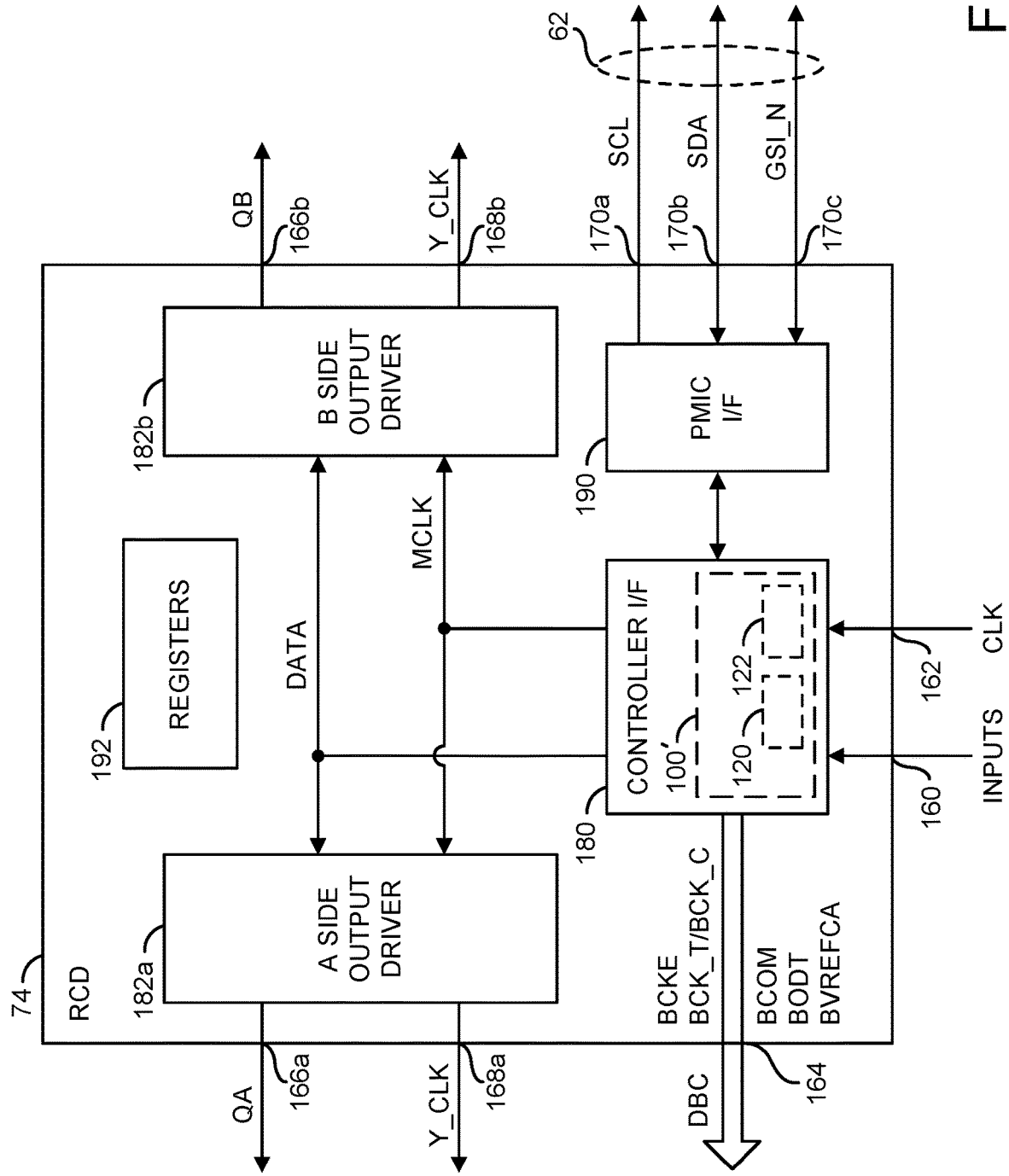
FIG. 4 is a diagram illustrating a registered clock driver (RCD) in accordance with an embodiment of the invention.

Referring to FIG. 4, a diagram is shown illustrating the registered clock driver 74 in accordance with an embodiment of the invention. In various embodiments, the circuit 74 may implement a registered clock driver circuit (or chip). In various embodiments, the circuit 74 may be JEDEC compliant (e.g., compliant with the DDR4 specification entitled "DDR4 SDRAM", specification JESD79-4A, November 2013, published by the Joint Electron Device Engineering Council (JEDEC) Solid State Technology Association, Arlington, Va. and/or compliant with the DDR5 standard).

The circuit 74 may have an input 160 that receives input data (e.g., INPUTS), an input 162 that receives the clock signal CLK, an input/output 164 that may receive/transmit control information (e.g., DBC), outputs 166a and 166b that may provide data outputs (e.g., the Q outputs QA and QB, respectively), outputs 168a and 168b that may provide output clock signals (e.g., Y_CLK) and/or inputs/outputs 170a-170c that may send/receive data via the interface 62. The signals INPUTS and CLK may be received from a memory controller (e.g., the memory controller 20 in FIG. 1) via a memory bus of a motherboard. In an example, the signals INPUTS may be pseudo-differential using an external or internal voltage reference. The signals INPUTS may comprise the ADDR/CMD signals of FIGS. 1 and 2. In an example, the signal CLK may be implemented as differential clock signals CLK_t (true) and CLK_c (complement). The signals QA, QB, and Y_CLK may be presented to a number of memory chips (e.g., 84a-84n in FIG. 2). For example, the signals QA, QB and Y_CLK may implement an output address and control bus for a DDR4 RDIMM, DDR4

LRDIMM, DDR4 UDIMM and/or DDR5 memory module. The signal DBC may be implemented as a data buffer control bus.

The output 170a may present a signal (e.g., SCL). The input/output 170b may communicate a signal (e.g., SDA). The input/output 170c may communicate a signal (e.g., GSI_N). The signal SCL may be a clock signal. The signal SDA may be a data signal. For example, the signal SDA may communicate power data. The signal GSI_N may be an interrupt signal. The signal SDA and/or the signal GSI_N may be a bi-directional signal. The signal SCL, the signal SDA and/or the signal GSI_N may each be a portion of the information communicated using the RCD-PMIC interface 62. The number of signals, the number of connections and/or the type of data communicated using the RCD-PMIC interface 62 may be varied according to the design criteria of a particular implementation.

In various embodiments the circuit 74 may comprise a block 180, blocks (or circuits) 182a-182b, a block (or circuit) 190 and/or a block (or circuit) 192. The block 180 may implement a controller interface. The blocks 182a and 182b may implement output driver circuits. In some embodiments, the blocks 182a and 182b may be combined as a single output driver circuit 182. The block 190 may implement a PMIC interface (or port) 190. The block 192 may implement register space. The RCD circuit 74 may comprise other components (not shown). The number, type and/or arrangement of the components implemented by the RCD 74 may be varied according to the design criteria of a particular implementation.

The block 180 may be configured to generate a data signal (e.g., DATA) and a clock signal (e.g., MCLK). The block 180 may be configured to generate the pair of signals (e.g., BCK_T/BCK_C), a signal (e.g., BCOM), a signal (e.g., BCKE), a signal (e.g., BODT) and/or a signal (e.g., BVREFCA). The signals DATA and MCLK may be presented to the blocks 182a and 182b. In various embodiments, the signal DATA may be coupled to the blocks 182a and 182b by combinatorial logic (not shown). The blocks 182a and 182b may be configured to generate the signals QA, QB and Y_CLK.

The block 190 may be configured to generate the signal SCL. The block 190 may be configured to generate and/or receive the signal SDA and/or the signal GSI_N. The block 190 may be coupled with the controller interface 180. For example, the PMIC interface 190 and/or the controller interface 180 may be configured to facilitate communication between the PMIC 76 and the memory controller 20. The PMIC interface 190 may be enabled in response to the enable command received from the host memory controller 20. In an example, the enable command may be a VR Enable command generated by the host memory controller 20.

The block 192 may be configured to store data. For example the block 192 may comprise a number of registers used for reading from and/or writing to the RCD circuit 74. Generally, the register space 192 is coupled to the various components of the RCD 74 using combinational logic (not shown). The block 192 may comprise a pre-defined register space to store and/or communicate power data received from and/or to be written to the PMIC 76. The pre-defined registers may store configuration data used to adjust an operating state and/or a status of the RCD 74, the interface 62 and/or the PMIC 76. In some embodiments, one or more counters may be implemented to track control words received from the host memory controller 20.

In various embodiments, the circuit 74 may be enabled to automatically adjust a skew time of a plurality of output pins during a manufacturing test operation. In various embodiments, the circuit 74 may be enabled to adjust the skew time (e.g., tSkew) to within a single gate delay of a reference output clock. As used herein, the term tSkew may be defined as the phase difference between an output data signal or pin (e.g., Q) and an output clock signal or pin (e.g., Y_CLK). In an example, a DDR4 registered clock driver (RCD) may have sixty-six output pins. In another example, a DDR5 standard registered clock driver (RCD) may have a number of pins defined by the DDR5 standard. However, other numbers of output pins may be implemented to meet the design criteria of a particular implementation.

The circuit 74 may be configured to adjust the phase of the output pins relative to the clock signal Y_CLK (or to respective copies of the clock signal Y_CLK) to meet manufacturer specifications (e.g., within +/−50 ps, etc.). The granularity of the phase adjustment is generally determined by delay elements within the circuit 74. During production testing, the circuit 74 may be configured to perform a trimming process in response to signals from automated test equipment and provide a pass/fail indication to the automated test equipment. In various embodiments, the circuit 74 may be utilized to implement the RCD in DDR4 RDIMM, DDR4 LRDIMM, DDR4 UDIMM and/or DDR5 memory modules.

The signal SCL may be a clock signal generated by the RCD 74. The signal SCL may be a clock signal that operates independently from the system clock signal (e.g., the signals BCK_T/BCK_C, the signal CLK and/or the signal MCLK)). In an example, the clock signal SCL may be an I²C clock output from the RCD 74 to the PMIC 76 communicated over the point-to-point interface 62. The signal SDA may be a data signal generated by the RCD 74 and/or received by the RCD 74. For example, the signal SDA may enable the host memory controller 20 to write to the PMIC 76 through the RCD 74 and/or read from the PMIC 76 through the RCD 74. In an example, the power data signal SDA may be an I²C data input/output between the RCD 74 and the PMIC 76 communicated over the point-to-point interface 62. The RCD 74 may use the interface 62 to send/receive the power data to/from the PMIC 76. The host memory controller 20 may perform a read operation and/or a write operation to the RCD 74 as defined by the DDR5 standard. For example, the host memory controller 20 may read the power data stored in the pre-defined registers. In another example, the host memory controller 20 may write instructions for the PMIC 76 into the pre-defined registers.

The RCD 74 may use the interface 62 to perform periodic polling and/or interrupt handling. The RCD 74 may use the interface 62 to communicate to the PMIC 76 that the memory module(s) 50a-50n are in a low powered state. The PMIC 76 may detect the notification from the interrupt signal GSI_N and respond accordingly.

In some embodiments, the RCD circuit 74 may comprise the circuit 100'. In some embodiments, the circuit 100' may be implemented wholly or partially within the circuit 180. In some embodiments, the RCD circuit 74 may implement multiple instances of the circuit 100'. The circuit 100' implemented within the RCD circuit 74 may be configured to implement an architecture for obtaining DFE tap coefficients through an open loop training approach in a double data rate (DDR) memory system. The circuit 100' may have a similar implementation and/or functionality in the RCD 74 as in the data buffers 70a-70n (e.g., as shown in association with FIG. 3). Details of the circuit 100' may be described in association with FIGS. 5-8.

Figure 5:
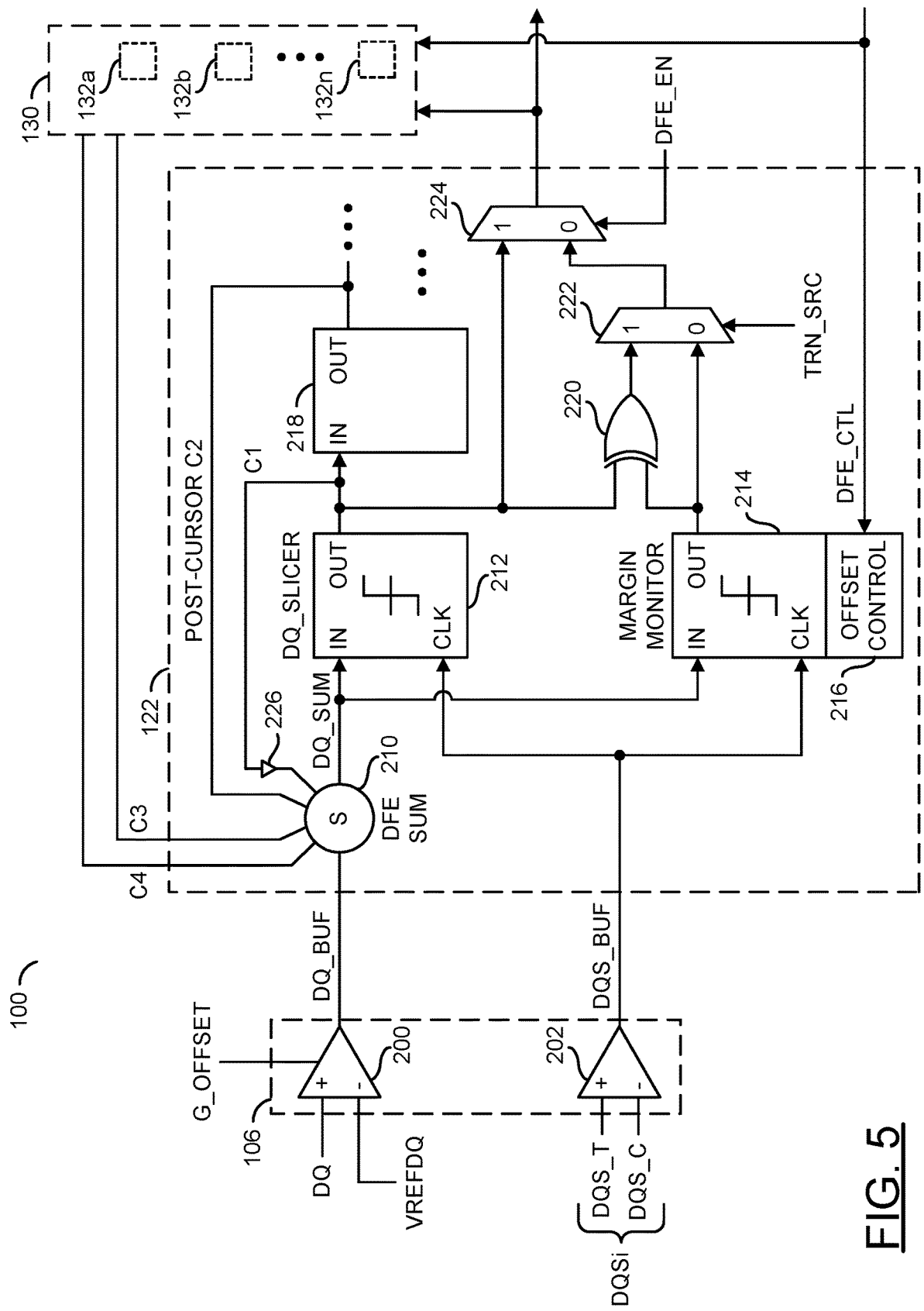
FIG. 5 is a block diagram illustrating a training circuit.

Referring to FIG. 5, a block diagram illustrating the training circuit 122 of the receiver 100 (or the receiver 100') is shown. The training circuit 122 is shown in the context of the apparatus 100. The example training circuit 122 may be implemented in one or more of the data buffers 70a-70n and/or the RCD 74. Various connections are shown between the training circuit 122 and the host interface 106 and between the training circuit 122 and the register block 130. Other circuits and/or logic (not shown) may be implemented in association with the host interface 106, the training circuit 122 and/or the register block 130.

The host interface 106 may comprise a block (or circuit) 200 and/or a block (or circuit) 202. The circuit 200 may implement an amplifier and/or buffer. The circuit 202 may implement an amplifier and/or buffer. The amplifier 200 and/or the amplifier 202 may each be configured to receive a differential input and present a single-ended output. The host interface 106 may comprise other components (not shown). The number, type and/or arrangement of the components of the host interface 106 may be varied according to the design criteria of a particular implementation.

The amplifier 200 may receive the signal DQ (e.g., one of the data signals DQa-DQn) and a signal (e.g., VREFDQ). The amplifier 200 may present the signal DQ_BUF. The signal VREFDQ may be a reference voltage for the signal DQ. The signal DQ and the signal VREFDQ may comprise a differential data input for the host interface 106. The amplifier 200 may receive a signal (e.g., G_OFFSET). The signal G_OFFSET may be configured to control a gain offset for the amplifier 200. The host interface 106 may be configured to present the signal DQ_BUF generated by the amplifier 200 to the training circuit 122.

The amplifier 202 may receive the signal DQSi (e.g., one of the strobe signals DQSa-DQSn). The signal DQSi may be a differential input signal for the host interface 106. The signal DQSi may comprise a signal component (e.g., DQS_T) and a signal component (e.g., DQS_C). The amplifier 202 may present the signal DQS_BUF. The host interface 106 may be configured to present the signal DQS_BUF generated by the amplifier 202 to the training circuit 122.

The training circuit 122 may comprise a block (or circuit) 210, a block (or circuit) 212, a block (or circuit) 214, a block (or circuit) 216, a block (or circuit) 218, a block (or circuit) 220, a block (or circuit) 222, a block (or circuit) 224 and/or a block (or circuit) 226. The circuit 210 may implement a summation circuit. The circuit 212 may implement a slicer circuit (or flip-flop or latch). For example, the circuit 212 may be a DQ_SLICER. The circuit 214 may implement a margin monitor (e.g., an eye monitor). The circuit 216 may implement an offset control. The circuit 218 may implement a next stage (or flip-flop or latch) of a slicer circuit. For example, the circuit 212 may be a first stage of a shift register and the circuit 218 may be a second stage of a shift register. The circuit 220 may implement a logic circuit. In the example shown, the logic circuit 220 may be an exclusive OR (e.g., XOR) gate. The circuit 222 may implement a multiplexer. The circuit 224 may implement a multiplexer. The circuit 226 may implement a buffer. The training circuit 122 may comprise other components (not shown). The number, type, functionality and/or arrangement of the components of the training circuit 122 may be varied according to the design criteria of a particular implementation.

The summation circuit 210 may be a DFE summer. The DFE summer 210 may be configured to receive the signal DQ_BUF and/or a number of DFE tap coefficients (e.g., C1-C4). The DFE summer 210 may be configured to combine (e.g., apply) the DFE tap coefficients to the data signal DQ_BUF. In one example, the DFE summer 210 may subtract the DFE tap coefficients from the output of a linear equalizer for the signal DQ_BUF. The DFE summer 210 may generate the signal DQ_SUM. The signal DQ_SUM may comprise the data signal with the applied DFE tap coefficients. The signal DQ_SUM may be presented to the slicer 212 and/or the margin monitor 214.

The slicer circuit 212 may be configured to capture a state of an analog signal at a particular point in time and/or determine whether the analog signal is above or below a pre-determined threshold level. In an example, the particular point in time that the state of the analog signal is captured may be determined by an edge of a signal at a CLK input of the slicer circuit 212. In an example, the slicer circuit 212 may be represented as a D type flip-flop (e.g., stores the level of the 'D' input (e.g., IN) on each specific transition of the CLK input).

The slicer circuit 212 may be configured to receive the signal DQ_SUM and the signal DQS_BUF. The signal DQ_SUM may be received at an input port of the slicer circuit 212 (e.g., the IN or 'D' port). The signal DQS_BUF may be received at a clock port (e.g., CLK) of the slicer circuit 212. For example, the slicer circuit 212 may be clocked by the data strobe signal. The slicer circuit 212 may capture the state of the signal DQ_SUM at the edge of the signal DQS_BUF.

The slicer circuit 212 may present an output. The output of the slicer circuit 212 may be presented to the DFE summer 210. For example, the output of the slicer circuit 212 may be used a one of the DFE tap coefficients (e.g., C1). The output of the slicer circuit 212 may be presented to the circuit 218, a first input of the logic gate 220 and/or a first input of the multiplexer 224. The slicer circuit 212 may be part of the data path of the receiver 100 during normal read/write operation (e.g., mission mode). For example, after capturing the value of the signal DQ_SUM at a first cycle of the signal DQS_BUF, the output port (e.g., OUT) of the slicer circuit 212 may present the captured value from the first cycle at a second cycle of the signal DQS_BUF and capture the state of the signal DQ_SUM for the second cycle of the signal DQS_BUF.

The margin monitor circuit 214 may be configured to monitor an eye of the data input. Details of the eye monitoring may be described in more detail in association with FIG. 8. The apparatus 100 may be configured to maintain a large eye opening for the receiver by reducing intersymbol interference. The margin monitor circuit 214 may be configured to receive the signal DQ_SUM and the signal DQS_BUF. The signal DQ_SUM may be received at an input port of the margin monitor circuit 212. The signal DQS_BUF may be received at a clock port of the margin monitor 214. For example, the margin monitor 214 may be clocked by the data strobe signal. The margin monitor circuit 214 may present an output. The output of the margin monitor circuit 214 may be presented to a second input of the logic gate 220 and/or a second input of the multiplexer 222.

The margin monitor 214 may be configured to determine the transition values (e.g., voltages) at various sampling times (e.g., corresponding to the data strobe signal DQS_BUF) for the signal DQ_SUM (e.g., transition from 1-0 or transition from 0-1). When the apparatus 100 is not training (e.g., during mission mode), the margin monitor circuit 214 may be ignored. In some embodiments, when not training, the margin monitor circuit 214 may be turned off to save power.

The offset control circuit 216 may be a component of the margin monitor circuit 214. The offset control circuit 216 may be configured to adjust an offset voltage for the margin monitor circuit 214. The offset control circuit 216 may receive a signal (e.g., DFE_CTL). The signal DFE_CTL may determine the amount of offset generated by the offset control circuit 216. The offset control circuit 216 may adjust the slicer trip point up (e.g., positive) or down (e.g., negative) with respect to the trip point of the DQ slicer circuit 212. The signal DFE_CTL may be generated by higher level logic that determines when and/or how to train (e.g., the host memory controller 20).

The circuit 218 may be configured to store a value (e.g., a bit) that was previously captured by the slicer circuit 212 on a previous cycle of the signal DQS_BUF (e.g., the CLK input of the slicer circuit 212). For example, the circuit 218 may be a second stage of a shift register. In some embodiments, the circuit 218 may have an implementation similar to a D type flip-flop.

The circuit 218 may be configured to receive the output from the slicer circuit 212. The output from the slicer circuit 212 may be received by an input port of the circuit 218. The circuit 218 may present an output. The output of the circuit 218 may be used as one of the DFE tap coefficients (e.g., C2). The training circuit 122 may comprise additional circuit stages similar to the circuit 218 (e.g., next stages of a shift register). Each of the circuit stages may be configured to present an input to the next circuit stage and/or provide one of the DFE tap coefficients (e.g., C3, C4, etc.). The number of stages of the shift register (e.g., the slicer circuit 212, the circuit 218, and a number of additional circuits similar to the circuit 218) may be varied according to the design criteria of a particular implementation.

The training circuit 122 may implement a shift register. The shift register may comprise the DQ slicer 212, the latch 218 and/or additional latches (e.g., connected after the latch 218). The elements of the shift register may be configured to provide the DFE tap coefficients C1-C4 as post-cursor values. The elements of the shift register may capture incoming bits of the signal DQ_SUM over time. For example, the DQ slicer 212 may store the incoming bit, and the latch 218 may receive the preceding bit. In the example shown in association with FIG. 5, the element 212 and the element 214 are shown. However, the shift register may comprise enough registers to contain voltage levels at previous time units used to create the DFE levels (e.g., C1, C2, C3, C4, etc.). In an example, at a time T0, the element 212 may store a current bit and the element 218 may not store a bit. Then, at the time T1, the element 218 may store the previous current bit that was stored in the element 212 and the element 212 may receive a next incoming bit. Examples of the shift register storing the DFE levels may be described in association with FIG. 6 and FIG. 7.

The logic gate 220 may be configured to perform a logical exclusive OR operation. The logic gate 220 may receive the output from the slicer circuit 212 and the output from the margin monitor circuit 214. The logic gate 220 may present an output in response to the logical XOR operation of the output of the slicer circuit 212 and the output of the margin monitor circuit 214. The output of the logic gate 220 may be presented to a first input of the multiplexer 222. In an example, the logic gate 220 may provide a difference between the output of the margin monitor 214 and the output of the DQ slicer 212 (e.g., the mission mode data as recovered from the nominal slicing level of the DQ slicer 212).

The multiplexer 222 may be configured to receive the output of the logic gate 220 at a first input. The multiplexer 222 may be configured to receive the output of the margin monitor circuit 214 at a second input. The multiplexer 222 may receive a signal (e.g., TRN_SRC) at a selection input. The signal TRN_SRC may be configured to enable the training mode for the training circuit 122. The signal TRN_SRC may be generated in response to higher level logic that determines when and/or how to perform the training (e.g., a signal generated based on decisions by the host memory controller 20). The signal TRN_SRC may be used to determine the method to use for training by controlling the multiplexer 222 to select the XOR result from the logic circuit 220 or the margin monitor flip-flop 214. The output of the multiplexer 222 may be presented to a second input of the multiplexer 224. The multiplexer 222 may be configured to select a source of the training data (e.g., from the XOR gate of the output of the slicer circuit 212 and the eye monitor circuit 214 or the eye monitor output) in response to the signal TRN_SRC.

The multiplexer 222 may be configured to select between two different methods of using the output of the margin monitor 214. A first method using the first input of the multiplexer 222 may receive the XOR result from the logic gate 220 (e.g., the difference between the output of the margin monitor 214 and the DQ slicer 212). In one example, during mission mode, the margin monitor 214 may be used to handle errors from the DQ slicer 212. A second method using the second input of the multiplexer 222 may receive the output from the margin monitor 214 to access the bit-pattern being received as determined by the slicing level of the margin monitor 214. The bit-pattern determined by the slicing level of the margin monitor 214 may be used when "known data" (e.g., a single bit response to be described in association with FIG. 6 and FIG. 7) is to be compared with recovered data (e.g., may be preferable for calibration). The input waveform may be decoded at each slicing (voltage) level of the margin monitor 214 to facilitate the calculation of the feedback coefficients at all times (e.g., T0-Tn) at each voltage level.

The multiplexer 224 may be configured to receive the output of the slicer circuit 212 at a first input. The multiplexer 224 may be configured to receive the output of the multiplexer 222 at a second input. The multiplexer 224 may receive a signal (e.g., DFE_EN) at a selection input. The signal DFE_EN may be configured to enable the storage of the DFE coefficients (e.g., C1-C4) during training or present the data input during normal operation (e.g., in mission mode after training). The signal DFE_EN may be generated in response to higher level logic that determines when and/or how to perform the training (e.g., a signal generated based on decisions by the host memory controller 20). The output of the multiplexer 224 may be presented to the register block 130 (e.g., the DFE feedback DAC). The output of the multiplexer 224 may be presented as an output of the training circuit 122. The output of the multiplexer 224 may be the internal DQ signal. For example, the output of the multiplexer 224 may be presented to the memory interface 104.

The multiplexer 224 may be part of the data path of the receiver 100. For example, the data path may comprise the summer circuit 210, the slicer circuit 212, the multiplexer 224 and the output DQ to the memory interface 104 during the normal (e.g., mission) mode of operation. In an example, during mission mode operation the multiplexer 224 may select the output of the DQ slicer 212. In an example, during the training mode of operation, the multiplexer 224 may select the output of the multiplexer 222.

The register block 130 may comprise the registers 132a-132n. The registers 132a-132n may store the DFE tap coefficients (e.g., C1-C4). In some embodiments, the register block 130 may perform the functionality of a DFE feedback DAC (digital-to-analog controller). The register block 130 may receive the signal DFE_CTL and/or the output from the multiplexer 224. For example, the signal DFE_CTL may enable the registers 132a-132n to store the coefficients C1-C4 in response to the training. The DFE coefficients may be received from the output of the multiplexer 224 during the training mode of operation.

The register block 130 may be configured to present one or more of the DFE coefficients C1-C4 to the summer circuit 210 as feedback. In some embodiments, the register block 130 may be implemented in a register space defined by the JEDEC specification. For example, in the RCD 74, the register block 130 may be implemented as part of the registers 192. In the example shown, the register block 130 may be near the training circuit 122. However, the registers 132a-132n may be located with other registers on the chip (e.g., the data buffers 70a-70n and/or the RCD 74).

The DFE coefficients C1-C4 may be obtained from training for each specific channel using the training circuit 122. The DFE coefficients C1-C4 may be applied to the data path using system settings. The apparatus 100 may provide a simple and robust training implementation to obtain DFE tap coefficients C1-C4. In some embodiments, the DFE coefficients C1-C4 may be applied by the DFE feedback DAC 130 (e.g., in mission mode to cancel the ISI). In some embodiments, the coefficients C1-C4 may be post-cursor values applied by the elements (e.g., the DQ slicer 212, the circuit 218, etc.) of the shift register (e.g., during training mode to determine the effects of the interference).

The data path of the receiver 100 (e.g., the input DQ to the host interface 106, to the DFE summer 210, to the DQ slicer circuit 212 to the multiplexer 224 to the output of the training circuit 122, etc.) may be affected by intersymbol interference (ISI) (e.g., due to band limitations on the data path channel and/or reflections). For example, one symbol (e.g., data bit(s)) may interfere with subsequent symbols. Each data pulse may be allotted a time interval for communication (e.g., the sampling time). For example, the sampling time may correspond to the timing of the data strobe signal DQS_BUF. When the data pulse extends beyond the allotted sampling time, there may be interference with neighboring pulses (e.g., one pulse may affect another pulse). The ISI may reduce signal integrity. The apparatus 100 may be configured to reduce the effects of ISI on the data path.

The apparatus 100 may determine the DFE tap coefficients C1-C4 through open loop training. For example, the host memory controller 20 may be configured to enable a training mode of operation for the apparatus 100 (e.g., by asserting the signal DFE_EN). When the training mode is enabled, the training circuit 122 may initiate a single bit response for one channel to evaluate and/or capture ISI at various receiver post-cursor sampling points. In an example, the post-cursor sampling points may be received from the shift register and then presented to the margin monitor 214 as feedback. The ISI may be determined by the separate eye monitor slicer circuit 214 proposed by the JEDEC specification. The ISI may be determined based on a combination of the shift register (e.g., the DQ slicer circuit 212, the latch 218, etc.) and the margin monitor 214.

The DFE tap coefficients C1-C4 may be obtained from captured post-cursor values. The obtained DFE tap coefficients C1-C4 may be applied through a DFE loop (e.g., feedback from the circuit 212, the circuit 218 and/or from the register block 130) to cancel ISI. The DFE tap coefficients C1-C4 may be applied during an operating mode of the memory modules 50a-50n (e.g., during a receiver mission mode when the host memory controller 20 is sending/receiving data).

During the training mode, the 1/0 (e.g., high/low) response may be assumed to be symmetrical. If the response is not symmetrical then an average value may be used. The data buffers 70a-70n and/or the RCD 74 may operate at the normal data rate during the training mode and the codes for VGA and/or CTLE may be set (e.g., to select a gain value). The margin mode may be activated (e.g., by activating the signal DFE_CTL). The DFE training reference voltage may be swept to determine the amount of ISI for each of the channels.

Once the amount of ISI is determined for the channel, the ISI may be mapped to a DFE tap weight (e.g., the tap coefficients C1-C4) assuming that the DFE tap settles fast enough in one update interval. The training process may be repeated for all DQ pins (e.g., DQa-DQn). For example, the training circuit 122 may correspond to the channel corresponding to the data signal DQi. A similar training circuit 122 may be implemented for each of the data signals DQa-DQn. The trained DFE coefficients may be stored in registers of the data buffers 70a-70n (e.g., the registers 132a-132n) and/or the RCD 74 (e.g., the registers 192). Each bit may have coefficients independent from other bits (e.g., the coefficients C1-C4 may not be shared with other bits).

In some embodiments, the training process may be performed for all the input/output channels (e.g., DQ pins) one at a time. Training each input/output channel one at a time may be implemented to keep all other channels (e.g., those I/O channels not currently being trained) quiet. For example, all other I/O channels that are not being trained may be kept to a static logical '1' value or a static logical '0' value. Keeping all other channels that are not being trained quiet may remove an impact of cross-talk on the training result (e.g., isolate the interference on a particular channel).

Figure 6:
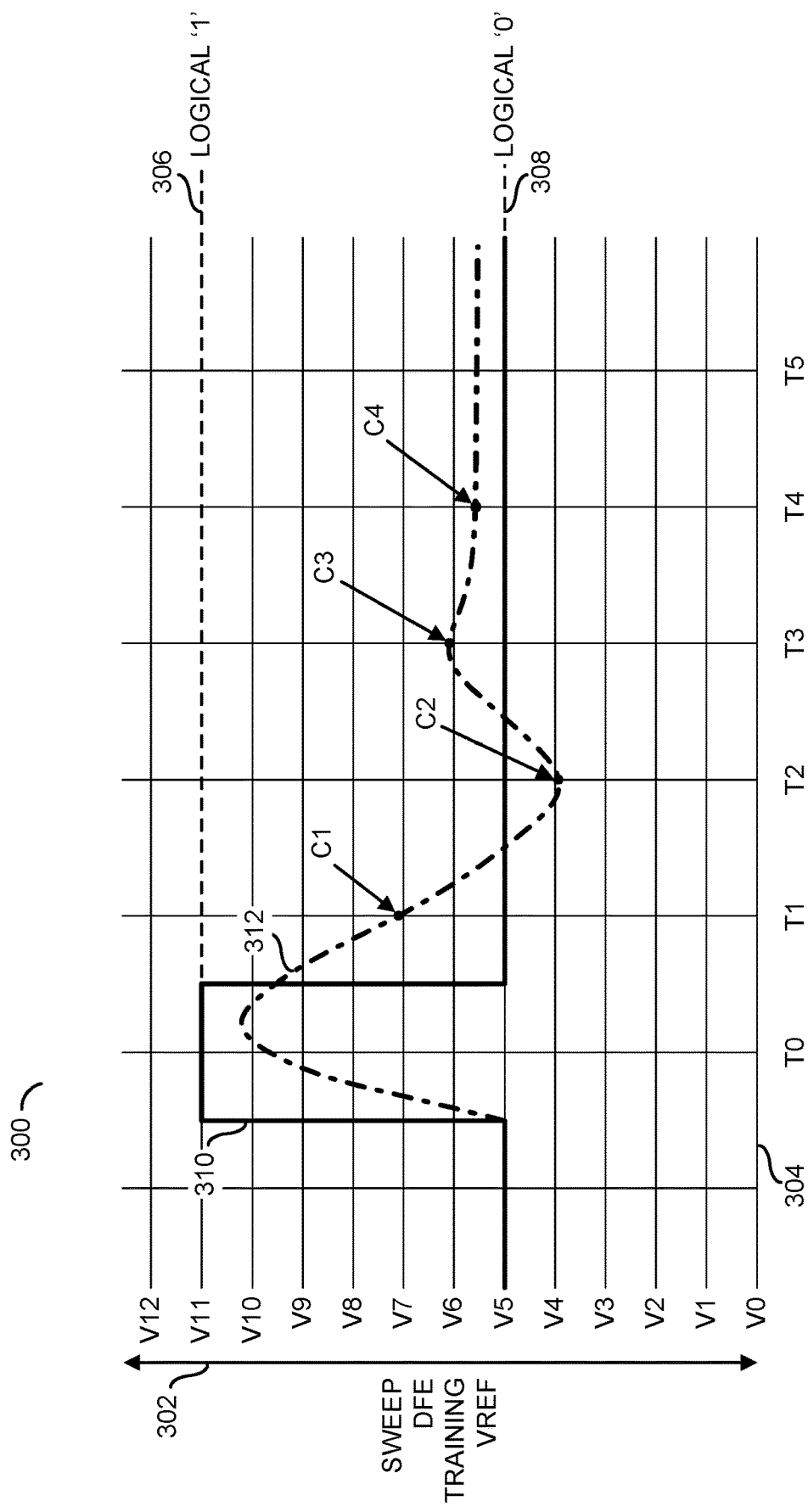
FIG. 6 is a diagram illustrating an example single bit "1" response.

Referring to FIG. 6, a diagram illustrating an example single bit "1" response is shown. A graph 300 is shown. The graph 300 may be a single bit response for a logical 'high' (or logical '1') pulse. The graph 300 may comprise an axis 302 and an axis 304. The axis 302 may be a vertical axis representing various voltage levels (or steps). In the example shown, the voltage levels may be V0-V12. In one example, the voltage levels may have a step size of 3 mV and the range of V0-V12 may be from 0 mV to 36 mV. The number of voltage levels and/or the values of each voltage level may be varied according to the design criteria of a particular implementation. Generally, the voltage levels and/or values of each voltage level may be fixed for a particular implementation.

The axis 304 may be a horizontal axis representing various times. In the example shown, the times may be T0-T5. The times T0-T5 may correspond to sampling times (e.g., post-cursor sampling points). In an example, the time units T0-T5 may correspond to a Unit Interval (UI) or the specific time between adjacent transitions of the incoming bitstream. In one example, for a 1 Gb/s data stream, the UI may be fns. The sampling times may correspond to the mission mode sampling times when the devices (e.g., the data buffers 70a-70n and/or the RCD 74) are in a normal mode of operation (e.g., non-training mode). The sampling times T0-T5 for training may be the same as the sampling time during mission mode operation to obtain accurate ISI values (e.g., ISI values that are representative of ISI that may occur when transmitting data to/from the host memory controller 20 during operation of a computer).

A horizontal line 306 and a horizontal line 308 are shown on the graph 300. The line 306 may represent a logical 'high' (or logical '1') voltage level. In the example shown, the logical high line 306 may correspond to the voltage level V11. The line 308 may represent a logical 'low' (or logical '0') voltage level. In the example shown, the logical low line 308 may correspond to the voltage level V5. The logical low line 308 may represent a DC offset. Generally, the DC offset may be determined according to the characteristics (e.g., process variations) of the particular circuit elements implemented. The DC offset may be determined before ISI measurements. The ISI measurements may be referenced to the DC level. The voltage levels for the logical high line 306 and the logical low line 308 may be varied according to the design criteria of a particular implementation.

The margin monitor 214 may be configured to monitor a sweep of the reference voltage (e.g., the signal VREFDQ), generated in response to the host memory controller 20, using the various voltage levels V0-V12. The offset control circuit 216 may set the DC offset (e.g., the logical low line 308) to adjust a trip point in response to the signal DFE_CTL. The memory controller 20 may provide a pulse on the signal DQ. The training circuit 122 may monitor the response of the various input/output channels in response to the pulse. In the example shown, the pulse may be a logical '1' pulse.

A line 310 is shown. The line 310 may be a data transmit waveform. The waveform 310 may represent a response of the signal DQ_BUF. For example, the memory controller 20 may provide a pulse as the signal DQ and the signal DQ_BUF may represent the pulse as received by the training circuit 122. In the example shown, the DQ_BUF response waveform 310 may correspond to a logical 'high' pulse. For example, the DQ_BUF response waveform 310 may be at a logical low (e.g., at the line 308 before the time T0), transition to a logical high value (e.g., at the line 306 at approximately the time T0) and then transition back to the logical low value (e.g., at the line 308 before the time T1). For example, the waveform 310 may represent a long string of logical '0' values followed by a single bit logical '1' value then followed by a long string (e.g., longer than the number of DFE taps) of logical '0' values.

A line 312 is shown. The line 312 may represent a waveform at the DFE summer circuit 210. For example, the waveform 312 may correspond to the signal DQ_SUM. The waveform 312 may represent the signal DQ_SUM when the DFE coefficients C1-C4 are not applied. In one example, the DFE coefficients C1-C4 from the DFE feedback DAC 130 may not be applied during the training mode. Generally, the waveform 312 may be a response that follows the shape of the DQ_BUF response waveform 310. For example, at the time T0, the waveform 312 is shown at approximately V10 when the logical high pulse portion of the waveform 310 is active. In the example shown, the waveform 312 returns to approximately the voltage level V4 after the pulse waveform 310 returns to logical low (e.g., the waveform 312 may undershoot the logical low line 308 at the time T2, then overshoot the logical low line 308 at the time T3 and then settle close to the logical low line 308). While the waveform 312 may generally follow the pulse 310, the waveform 312 may not be an exact match due to the effects of ISI.

A number of points C1-C4 are shown on the waveform 312. The points C1-C4 may represent the DFE tap coefficient values for the input/output channel. The waveform 312 may be sampled at the sampling points T1-T4 after the logical high pulse to determine residual effects (e.g., the ISI) from the pulse. For example, the pulse may be received at the sampling time T0, and the residual effects of the pulse may be determined at the sampling times (e.g., T1-T4) corresponding to a time that a subsequent data input would be received.

In an example, the DFE tap coefficient values may be received from the elements of the shift register (e.g., the DQ slicer 212, the latch 218 and additional elements). In an example, when the single bit response is presented at the time T0, the DQ slicer 212 may receive the single bit response (e.g., the logical high value in the example shown). Then, at the time T1, the coefficient C1 may be an output of the DQ slicer 212 and the DQ slicer input may receive the next bit (e.g., the logical low bit) and the latch 218 may receive the output from the DQ slicer 212. Then, at the time T2, the coefficient C2 may be an output from the latch 218 and the DQ slicer input may receive the next bit (e.g., the logical low bit), the latch 218 may receive the output from the DQ slicer 212 (e.g., the logical low value from the time T1) and the latch 218 may present the T0 bit to the next element of the shift register. Continuing the example, the coefficient C3 may be received from the next element of the shift register (not shown, but implied in association with FIG. 5).

In the training mode, the margin monitor 214 may receive the post-cursor values C1-C4 from the shift register elements (e.g., the DQ slicer 212, the latch 218, etc.). The post-cursor values C1-C4 may be provided as feedback to enable the margin monitor 214 to determine the interference effects of the known input (e.g., the single bit response), over a known amount of time. For example, the post-cursor value C1 may provide the interference effects of the single bit response at the time T1, the post-cursor value C2 may provide the interference effects of the single bit response at the time T2, etc. Once the interference effects are known, then the DFE coefficients C1-C4 provided by the DFE feedback DAC 130 may be used to prevent the interference effects during the mission mode.

Generally, the coefficients C1-C4 may represent the transition values. For example, the coefficient C1 may correspond to the reference voltage level V7, the coefficient C2 may correspond to the reference voltage level V4, the coefficient C3 may correspond to the reference voltage level V6 and the coefficient C4 may correspond to the reference voltage level V5. The coefficient values C1-C4 may be applied to the DFE summer circuit 210 as feedback to counteract the ISI effects of the input/output channel. For example, the coefficient values C1-C4 may be subtracted from the signal DQ_BUF using the summer circuit 210.

The training circuit 122 may be configured to find the corresponding transitions of the DFE training reference voltage value at the sampling points T0-T4. The transitions may be determined by reading the output of the margin monitor (e.g., the eye monitor slicer) circuit 214. The voltage level of the transition values may be the ISI that may be mapped to the DFE tap weights C1-C4.

In the example shown, the response of the DQ waveform 310 and the response waveform 312 may correspond to values shown in association with a table (e.g., TABLE 1):

TABLE 1

| DFE Training Result | Data (DQ) | C1 | C2 | C3 | C4 |
| --- | --- | --- | --- | --- | --- |
| V12 | 0 | 0 | 0 | 0 | 0 |
| V11 | 0 | 0 | 0 | 0 | 0 |

TABLE 1-continued

| DFE Training Result | Data (DQ) | C1 | C2 | C3 | C4 |
|---|---|---|---|---|---|
| V10 | 0 | 0 | 0 | 0 | 0 |
| V9 | 1 | 0 | 0 | 0 | 0 |
| V8 | 1 | 0 | 0 | 0 | 0 |
| V7 | 1 | [1] | 0 | 0 | 0 |
| V6 | 1 | 1 | 0 | [1] | 0 |
| V5 (DC Level) | 1 | 1 | 0 | 1 | [1] |
| V4 | 1 | 1 | [1] | 1 | 1 |
| V3 | 1 | 1 | 1 | 1 | 1 |
| V2 | 1 | 1 | 1 | 1 | 1 |
| V1 | 1 | 1 | 1 | 1 | 1 |
| V0 | 1 | 1 | 1 | 1 | 1 |

In the example shown, the transition value (e.g., from logical 1 to logical 0) for the sampling point T1 may be V7, the transition value for the sampling point T2 may be V4, the transition value for the sampling point T3 may be V6 and the transition value for the sampling point T4 may be V5. The DFE coefficients C1-C4 may be mapped corresponding to the transition values. How the DFE coefficients C1-C4 are mapped to the transition values may be varied according to the design criteria of a particular implementation.

The amount of ISI may be measured by the eye monitor slicer 214 and may be mapped to a DFE tap weight. In an example, the tap weight coefficient C4 may be approximately 21 mV. A tap weight of 21 mV may map to seven steps of DFE tap (e.g., with 3 mV steps). The training process may be repeated to find all DFE tap weights (e.g., for tap 2 to tap 4 to determine the coefficients C2-C4).

The eye monitor 214 may have a step size that is uniform across the range of voltages. In an example, the eye monitor 214 may have a step size of approximately 3 mV. The DFE feedback digital-to-analog converter (DAC) may have a step size different from the eye monitor 214. In some embodiments, the step size of the eye monitor 214 may not be the same as the step size of the DFE feedback DAC. The transition values may be quantized (e.g., up or down) to the nearest step number (e.g., 12 steps corresponding to the voltages V0-V12, in the example shown). If the step sizes of the eye monitor 214 and the DFE feedback DAC 130 are the same size, then the 12 steps of the readout of the eye monitor 214 may map to the 12 steps of the DFE feedback DAC 130. If the step sizes of the eye monitor 214 and the DFE feedback DAC 130 are different then the output of the eye monitor 214 may be made to be as close to the measured transition values as possible. For example, the mapping may be performed according to an equation (e.g., (eye monitor step size)*(number of eye monitor steps readout)=(DFE tap step size)*(number of DFE tap steps)).

By determining the values of the coefficients C1-C4, the apparatus 100 may determine compensation values. The compensation values may be values that, when applied using the summer circuit 210, may provide a pre-condition that anticipates ISI in order to prevent the ISI from closing the eye response of the received signal. The compensation values corresponding to the coefficients C1-C4 may be stored by the registers 132a-132n to provide feedback compensation. In an example, the coefficients C1-C4, may represent a level of undesired interference response that has been detected by the apparatus 100 during the training mode and the compensation values stored by the registers 132a-132n may negate, reduce and/or cancel the undesired interference during the mission mode.

Figure 7:
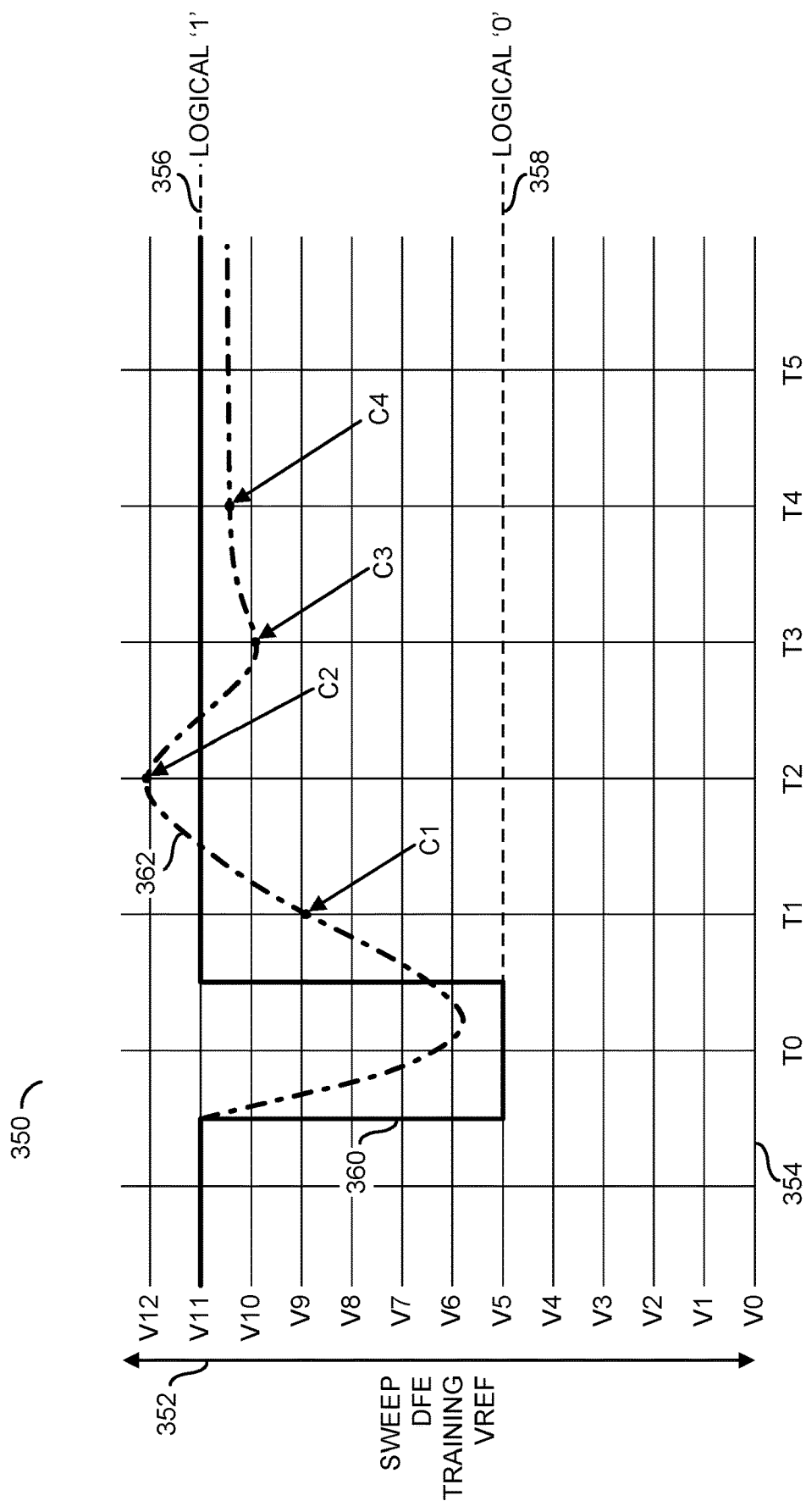
FIG. 7 is a diagram illustrating an example single bit "0" response.

Referring to FIG. 7, a diagram illustrating an example single bit "0" response is shown. A graph 350 is shown. The graph 350 may be a single bit response for a logical 'low' (or logical '0') pulse. The graph 350 may comprise an axis 352 and an axis 354. The axis 352 may be a vertical axis representing various voltage levels (or steps). In the example shown, the voltage levels may be C0-V12. The axis 354 may be a horizontal axis representing various times. In the example shown, the times may be T0-T5. The times T0-T5 may correspond to sampling times (e.g., post-cursor sampling points).

A horizontal line 356 and a horizontal line 358 are shown on the graph 350. The line 356 may represent a logical 'high' (or logical '1') voltage level. In the example shown, the logical high line 356 may correspond to the voltage level V11. The line 358 may represent a logical 'low' (or logical '0') voltage level. In the example shown, the logical low line 358 may correspond to the voltage level V5. The logical high line 356 may represent a DC offset. The voltage levels for the logical high line 356 and the logical low line 358 may be varied according to the design criteria of a particular implementation.

The offset control circuit 216 may set the DC offset (e.g., the logical high line 356) to adjust the trip point in response to the signal DFE_CTL. The memory controller 20 may provide a pulse on the signal DQ. The training circuit 122 may monitor the response of the various input/output channels in response to the pulse. In the example shown, the pulse may be a logical '0' pulse.

A line 360 is shown. The line 360 may be a data transmit waveform. The waveform 360 may represent a response of the signal DQ_BUF. For example, the memory controller 20 may provide a pulse as the signal DQ and the signal DQ_BUF may represent the pulse as received by the training circuit 122. In the example shown, the DQ_BUF response waveform 360 may correspond to a logical 'low' pulse. For example, the DQ_BUF response waveform 360 may be at a logical high (e.g., at the line 356 before the time T0), transition to a logical low value (e.g., at the line 358 at approximately the time T0) and then transition back to the logical high value (e.g., at the line 356 before the time T1). For example, the waveform 360 may represent a long string of logical '1' values followed by a single bit logical '0' value then followed by a long string (e.g., longer than the number of DFE taps) of logical '1' values.

A line 362 is shown. The line 362 may represent a waveform at the DFE summer circuit 210. For example, the waveform 362 may correspond to the signal DQ_SUM. The waveform 362 may represent the signal DQ_SUM when the DFE coefficients C1-C4 are not applied. The DFE coefficients C1-C4 may not be applied during the training mode. Generally, the waveform 362 may be a response that follows the shape of the DQ_BUF response waveform 360. For example, at the time T0, the waveform 362 is shown at approximately V6 when the logical low pulse portion of the waveform 360 is active. In the example shown, the waveform 362 returns high to approximately the voltage level V12 after the pulse waveform 360 returns to logical high (e.g., the waveform 362 may overshoot the logical high line 356 at the time T2, then undershoot the logical high line 356 at the time T3 and then settle close to the logical high line 356). While the waveform 362 may generally follow the pulse 360, the waveform 362 may not be an exact match due to the effects of ISI.

A number of points C1-C4 are shown on the waveform 362. The points C1-C4 may represent the DFE tap coefficient values for the input/output channel. The points C1-C4 may correspond to the sampling times T1-T4. In one example, the DFE tap coefficients may be received from the output of the elements of the shift register (e.g., the slicer 212, the latch 218, etc.). The waveform 362 may be sampled at the sampling points T1-T4 after the logical low pulse to determine residual effects (e.g., the ISI) from the pulse. For example, the pulse may be received at the sampling time T0, and the residual effects of the pulse may be determined at the sampling times (e.g., T1-T4) corresponding to a time that a subsequent data input would be received.

Generally, the coefficients C1-C4 may represent the transition values. For example, the coefficient C1 may correspond to the reference voltage level V9, the coefficient C2 may correspond to the reference voltage level V12, the coefficient C3 may correspond to the reference voltage level V10 and the coefficient C4 may correspond to the reference voltage level V11. The coefficient values C1-C4 may be applied to the DFE summer circuit 210 as feedback to counteract the ISI effects of the input/output channel. For example, the coefficient values C1-C4 may be subtracted from the signal DQ_BUF using the summer circuit 210.

The training circuit 122 may be configured to find the corresponding transitions of the DFE training reference voltage value at the sampling points T0-T4. The transitions may be determined by reading the output of the margin monitor (e.g., the eye monitor slicer) circuit 214. The voltage level of the transition values may be the ISI that may be mapped to the DFE tap weights C1-C4.

In the example shown, the response of the DQ waveform 360 and the response waveform 362 may correspond to values shown in association with a table (e.g., TABLE 2):

TABLE 2

| DFE Training Result | Data (DQ) | C1 | C2 | C3 | C4 |
|---|---|---|---|---|---|
| V12 | 0 | 0 | [1] | 0 | 0 |
| V11 (DC Level) | 0 | 0 | 1 | 0 | 0 |
| V10 | 0 | 0 | 1 | [1] | [1] |
| V9 | 0 | [1] | 1 | 1 | 1 |
| V8 | 0 | 1 | 1 | 1 | 1 |
| V7 | 0 | 1 | 1 | 1 | 1 |
| V6 | 1 | 1 | 1 | 1 | 1 |
| V5 | 1 | 1 | 1 | 1 | 1 |
| V4 | 1 | 1 | 1 | 1 | 1 |
| V3 | 1 | 1 | 1 | 1 | 1 |
| V2 | 1 | 1 | 1 | 1 | 1 |
| V1 | 1 | 1 | 1 | 1 | 1 |
| V0 | 1 | 1 | 1 | 1 | 1 |

In the example shown, the transition value (e.g., from logical 1 to logical 0) for the sampling point T1 may be V9, the transition value for the sampling point T2 may be V12, the transition value for the sampling point T3 may be V10 and the transition value for the sampling point T4 may be V10. The DFE coefficients C1-C4 may be mapped corresponding to the transition values.

Using either the logical '1' single bit response (e.g., as shown in association with FIG. 6 and/or the logical '0' single bit response (e.g., as shown in association with FIG. 7), the training circuit 122 may determine the DFE tap values C1-C4. The single bit response may be determined in a training mode of operation. For example, the training mode may be performed at start up (e.g., while a computing is booting up) and the DFE tap values C1-C4 may be written while the BIOS is brought up (e.g., during a power on self-test of a computer). If the operating voltage, temperature and/or data rate changes after the DFE coefficients have been trained, the training process may be performed again.

Figure 8:
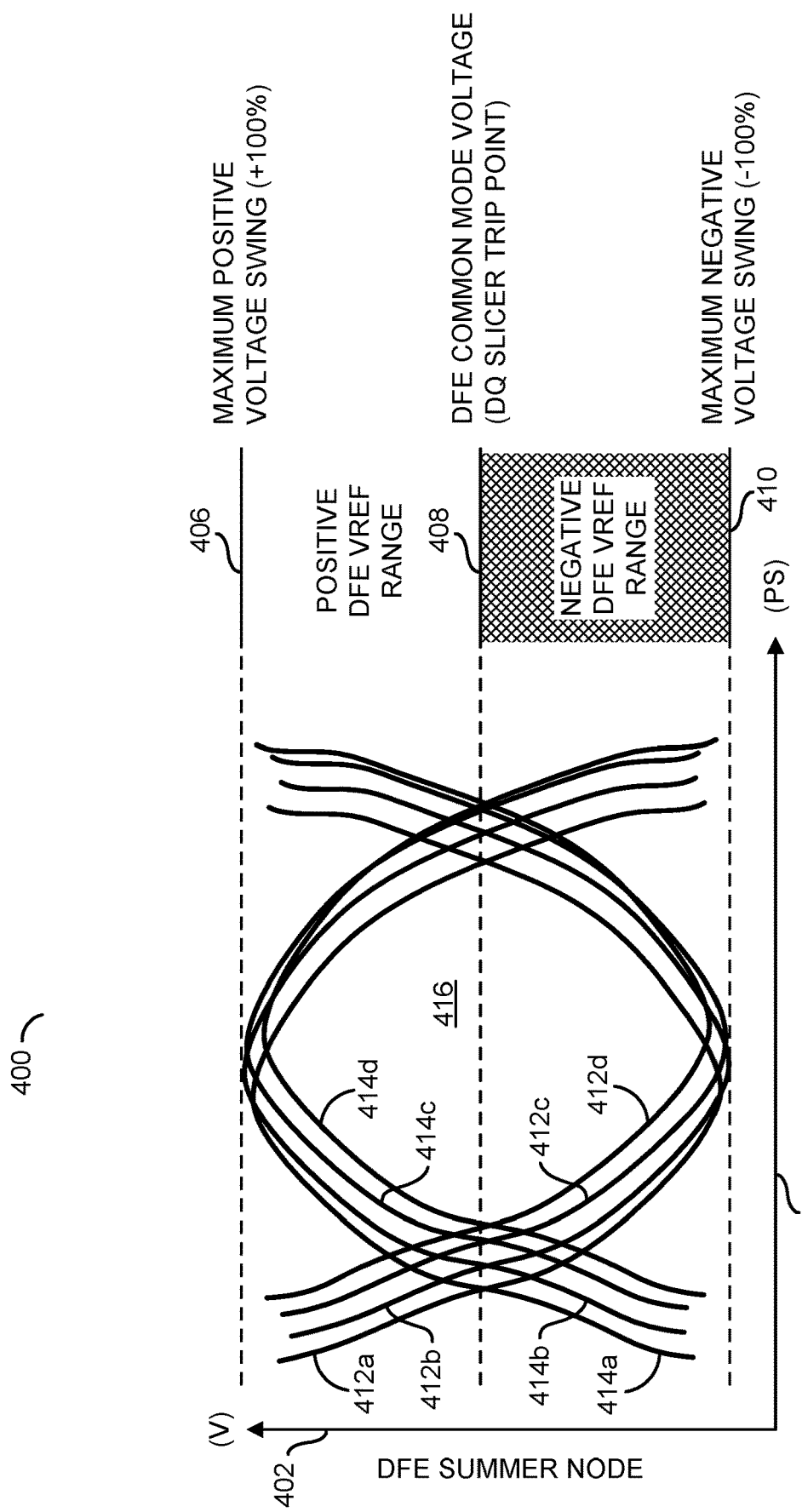
FIG. 8 is a diagram illustrating an eye monitor response for DFE training.

Referring to FIG. 8, a diagram illustrating an eye monitor response for DFE training is shown. An example eye response 400 is shown for data values at the node of the DFE summer 210 (e.g., measured by the eye monitor 214). The example eye response 400 is shown with an axis 402 and an axis 404. The axis 402 may be a vertical axis corresponding to a voltage value. The axis 404 may be a horizontal axis corresponding to a time value (e.g., measured in picoseconds).

A horizontal line 406, a horizontal line 408 and a horizontal line 410 are shown on the example eye response 400. The horizontal line 406 may represent a maximum positive voltage swing at the DFE summer 210 (e.g., a maximum positive value received from the signal DQ_BUF). The horizontal line 408 may represent a DFE common mode voltage. For example, the DFE common mode voltage may correspond to a trip point for the DQ slicer circuit 212 (e.g., the transition point for a signal to be determined as a logical high value or a logical low value). The horizontal line 410 may represent a maximum negative voltage swing at the DFE summer 210 (e.g., a maximum negative value received from the signal DQ_BUF).

The area between the trip point 408 and the maximum positive voltage swing 406 may represent a positive DFE reference voltage range. The area between the trip point 408 and the maximum negative voltage swing 410 may represent a negative DFE reference voltage range. The value of the maximum positive voltage 406, the trip point 408 and/or the maximum negative voltage 410 may be varied according to the design criteria of a particular implementation. The location of the trip point 408 may be adjusted (e.g., up or down) in response to the offset control circuit 216 (e.g., based on the signal DFE_CTL).

A number of lines 412a-412d are shown on the example eye response 400. A number of lines 414a-414d are shown on the example eye response 400. The lines 412a-412d and/or the lines 414a-414d may represent voltage waveforms detected at the DFE summer 210 (e.g., the signal DQ_SUM). The voltage waveforms 412a-412d and/or the voltage waveforms 414a-414d may be generated in response to receiving the signal DQ_BUF (e.g., in response to the data signals DQ).

The lines 412a-412d may represent a voltage response waveform corresponding to a negative DQ transition at the DFE summer 210. For example, each of the lines 412a-412d are shown transitioning from the positive range, to the negative range and then back to the positive range. The lines 414a-414d may represent a voltage response waveform corresponding to a positive DQ transition at the DFE summer 210. For example, each of the lines 414a-414d are shown transitioning from the negative range, to the positive range and then back to the negative range. In the example eye response 400, there may be four of the waveforms 412a-412d and four of the waveforms 414a-414d shown. However, the example eye response 400 may be representative of many more (e.g., hundreds and/or thousands) of data response samples overlaid on top of each other.

An area 416 is shown. The area 416 may be between the negative transition responses 412a-412d and the positive transition responses 414a-414d. The area 416 may have a general eye shape (e.g., narrow at the edges and wide in the middle). For example, the area 416 may be an eye opening of the data path of the receiver 100. Generally, a wide and/or high eye shape for the area 416 may correspond to good signal integrity and a narrow and/or short eye shape may correspond to poor signal integrity. For example, when the area 416 has a large eye height (e.g., as shown in the example eye response 400), the voltages may be farther from the trip point 408. In another example, when the area 416 has a large eye width (e.g., as shown in the example eye response 400), the sampling time for the received data input where ISI does not occur may be longer. The farther the responses 412a-412d and/or the responses 414a-414d are from the trip point 408, the more likely that the correct value will be interpreted. When the responses 412a-412d and/or the responses 414a-414d are close to the trip point 408, an incorrect value may be interpreted (e.g., a negative value may be difficult to distinguish from a positive value).

Intersymbol interference may result in lower signal integrity. Incoming DQ and/or command/address signals sent by the host memory controller 20 to the data buffers 70a-70n may suffer from ISI. The ISI may be caused by channel bandwidth limitations and/or reflections. The received signal eye 416 may become more closed (e.g., shorter in height and/or narrower in width) due to the effects of ISI. The DFE coefficients C1-C4 generated by the apparatus 100 may be configured to reduce ISI. The signal integrity may be increased in response to reducing the ISI. The apparatus 100 may increase the eye area 416.

By applying the DFE tap coefficients C1-C4, the receiver eye margin may be improved. The eye margin area 416 may be improved for data and/or commands communication in the data buffers 70a-70n and/or the RCD 74. By applying the training using the training circuit 122 to generate the DFE tap coefficients C1-C4, the noise margin of the data path may be reduced (e.g., the distance of the negative transition responses 412a-412d and the positive transition responses 414a-414d may be farther from the trip point 408). Reducing the noise margin of the data path may enable the receiver 100 to be less sensitive to errors in the timing of the samples.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to transmit signals to/from a plurality of I/O channels; and
   a training circuit configured to (i) generate a training voltage signal comprising a pulse on a current one of said I/O channels, (ii) read an output of an eye monitor slicer to determine voltage transition values corresponding to said training voltage signal at a plurality of sampling times, (iii) map said voltage transition values to coefficients for said current I/O channel, and (iv) determine said coefficients for each of said I/O channels, wherein (a) said training circuit comprises said eye monitor slicer and a multiplexer circuit, (b) said voltage transition values correspond to an interference response for said current I/O channel, (c) said coefficients are applied as feedback to cancel said interference, (d) said training voltage signal comprises a single bit in a first state followed by a string of bits in a second state, (e) in a training mode said multiplexer circuit allows said output of said eye monitor to be read directly to determine said voltage transition values, and (f) in a mission mode said multiplexer circuit presents a difference between said output of said eye monitor slicer and an output of a DO slicer to handle errors from said DQ slicer.

2. The apparatus according to claim 1, wherein said training voltage signal is applied to determine a single bit response of said current I/O channel.

3. The apparatus according to claim 1, wherein said string of bits in said second state is longer than the sampling times corresponding to a number of DFE taps.

4. The apparatus according to claim 1, wherein (a) a DC level for said current I/O channel is determined before determining said voltage transition values and (b) said voltage transition values are referenced to said DC level.

5. The apparatus according to claim 1, wherein said training circuit determines said coefficients in a first mode of operation of a memory circuit and said coefficients are applied in a second mode of operation of said memory circuit.

6. The apparatus according to claim 1, wherein said coefficients are updated in response to a change in at least one of an operation voltage, a temperature and a data rate.

7. The apparatus according to claim 1, wherein said apparatus generates said coefficients using an open loop training approach.

8. The apparatus according to claim 1, wherein said interface and said training circuit are implemented in a data buffer of a memory circuit.

9. The apparatus according to claim 1, wherein said interface and said training circuit are implemented in a registered clock driver of a memory circuit.

10. The apparatus according to claim 1, wherein said coefficients are decision feedback equalizer (DFE) tap coefficients.

11. The apparatus according to claim 1, wherein said interference response is an intersymbol interference (ISI).

12. The apparatus according to claim 1, wherein said interference response is caused by bandwidth limitations in said I/O channels and reflections.

13. The apparatus according to claim 1, wherein (i) said coefficients improve a receiver eye margin for said signals and (ii) said signals comprise one or more of (a) data signals and (b) command/address signals.

14. The apparatus according to claim 1, wherein respective coefficients are obtained for each of said I/O channels by independently training each of said I/O channels based on system settings.

15. The apparatus according to claim 1, wherein said training circuit determines said coefficients during a power on self test of a computing device.

16. The apparatus according to claim 1, wherein said voltage transition values determined at said sampling times correspond to post-cursor values.

* * * * *